(12) United States Patent
Tombez et al.

(10) Patent No.: US 11,788,866 B2
(45) Date of Patent: Oct. 17, 2023

(54) MAGNETIC POSITION SENSOR DEVICE, METHOD AND SYSTEM, WITH ERROR DETECTION

(71) Applicant: Melexis Technologies SA, Bevaix (CH)

(72) Inventors: Lionel Tombez, Bevaix (CH); Yves Bidaux, Bevaix (CH); Gael Close, Bevaix (CH)

(73) Assignee: MELEXIS TECHNOLOGIES SA, Bevaix (CH)

( * ) Notice: Subject to any disclaimer, the term of this patent is extended or adjusted under 35 U.S.C. 154(b) by 0 days.

(21) Appl. No.: 18/090,206

(22) Filed: Dec. 28, 2022

(65) Prior Publication Data

US 2023/0213358 A1 Jul. 6, 2023

(30) Foreign Application Priority Data

Dec. 31, 2021 (EP) .................................... 21218509

(51) Int. Cl.
G01D 5/14 (2006.01)
G01B 7/30 (2006.01)

(52) U.S. Cl.
CPC ............... *G01D 5/145* (2013.01); *G01B 7/30* (2013.01)

(58) Field of Classification Search
CPC .................................. G01D 5/145; G01B 7/30
See application file for complete search history.

(56) References Cited

U.S. PATENT DOCUMENTS 8,878,524 B2 11/2014 Heberle
11,255,699 B2* 2/2022 Hammerschmidt ..... G01D 3/08
11,371,862 B2* 6/2022 Dupre .................... G01D 3/036
11,598,653 B2* 3/2023 Nagata ................. G01D 5/2033
2013/0099777 A1 4/2013 Heberle
2021/0063135 A1* 3/2021 Antoku ..................... G01B 7/30

FOREIGN PATENT DOCUMENTS

| EP | 2584304 A1 | 4/2013 |
| EP | 3742129 A1 | 11/2020 |
| EP | 3742130 A1 | 11/2020 |
| EP | 3783316 A1 | 2/2021 |
| EP | 3885778 A1 | 9/2021 |

OTHER PUBLICATIONS

Search Report from corresponding European Application No. 21218509.4, dated Jun. 13, 2022.

* cited by examiner

*Primary Examiner* — Reena Aurora
(74) *Attorney, Agent, or Firm* — WORKMAN NYDEGGER

(57) ABSTRACT

A position sensor device comprising two or more magnetic sensors capable of measuring one or two or three orthogonal magnetic field components at various sensor locations; and a processing circuit for determining a first, a second and a third difference of two respective components, and for determining a first ratio of the first and second difference, and determining and outputting a first angle based on this first ratio; and for determining a second ratio of the first and third difference, for optionally determining a second angle, optionally comparing the two angles or the two ratios; and for outputting at least one of: the second angle, the two ratios, a diagnostic signal based on a comparison of the angles or ratios.

15 Claims, 14 Drawing Sheets

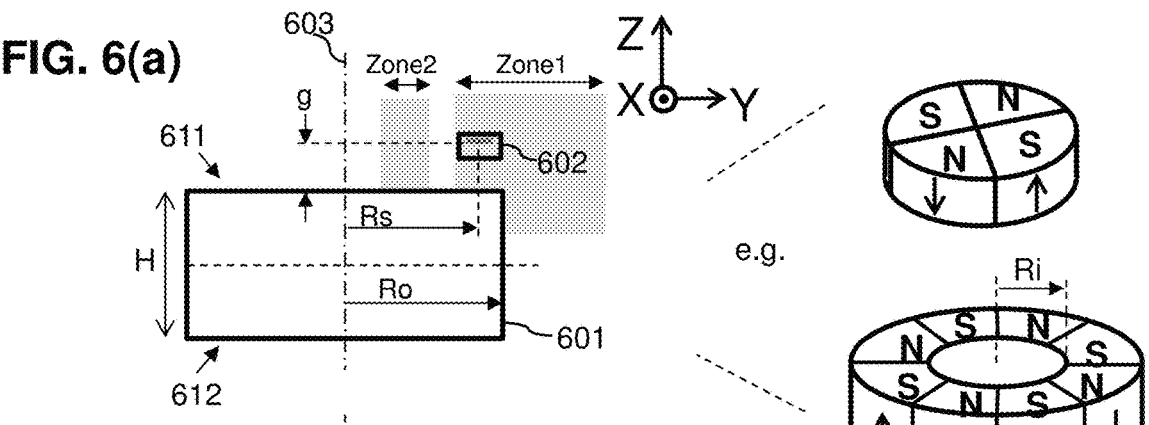

FIG. 6(a)

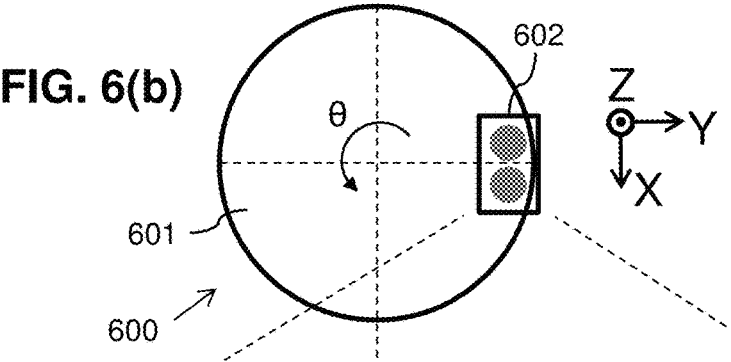

FIG. 6(b)

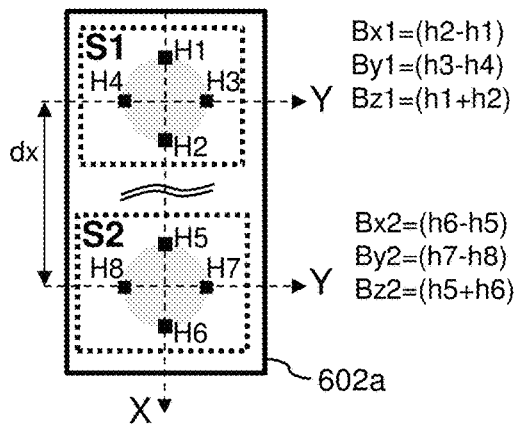

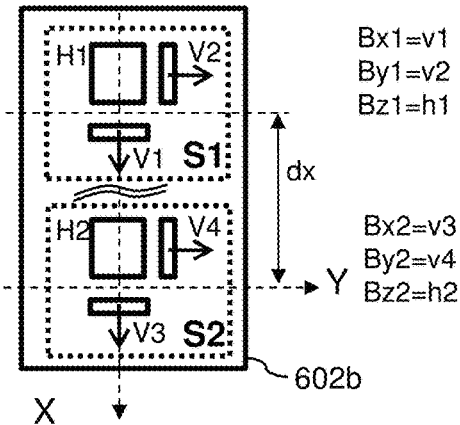

FIG. 6(d)

$Bx1=v1$
$By1=v2$
$Bz1=h1$ $Bx2=v3$
$By2=v4$
$Bz2=h2$ $\Delta Bx12=(Bx2-Bx1)$
$\Delta By12=(By2-By1)$
$\Delta Bz12=(Bz2-Bz1)$
---
$\theta main = atan2(\Delta Bx12, K1 \cdot \Delta Bz12)$
$\theta aux1 = atan2(\Delta Bx12, K2 \cdot \Delta By12)$

FIG. 6(e)

Test if: $\theta main \approx (\theta aux1)$,
or test if: $(K1 \cdot \Delta Bz12) \approx (K2 \cdot \Delta By12)$ Optional additional tests:
$(h4+h3) \approx (h1+h2)?$
$(h8+h7) \approx (h5+h6)?$

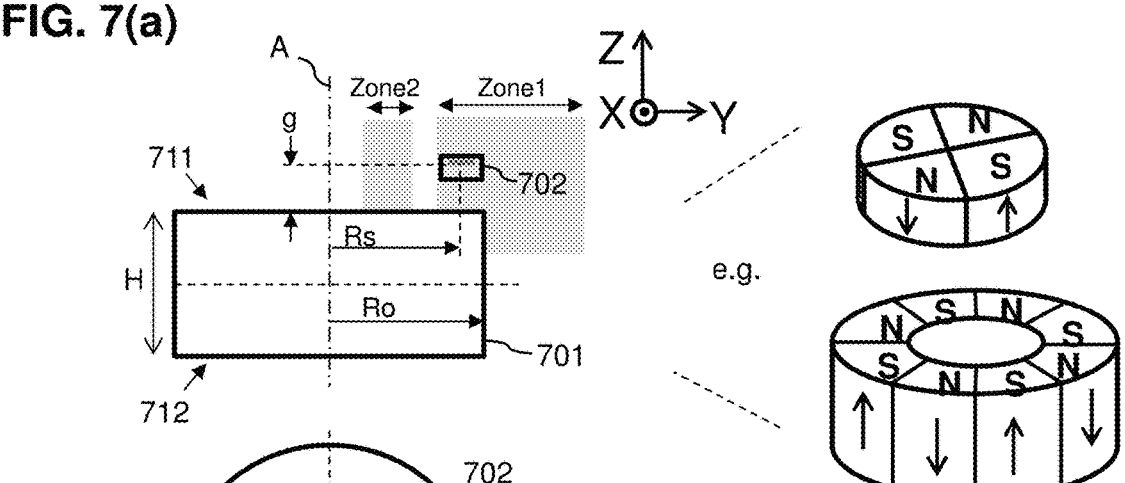

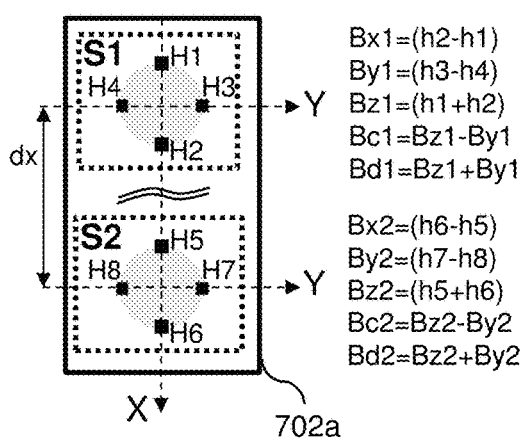

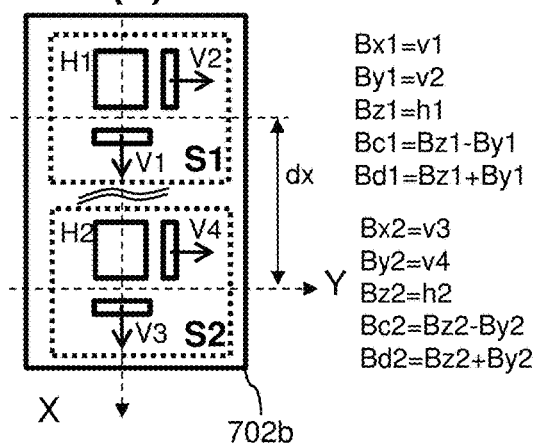

$Bx1=v1$
$By1=v2$
$Bz1=h1$
$Bc1=Bz1-By1$
$Bd1=Bz1+By1$ $Bx2=v3$
$By2=v4$
$Bz2=h2$
$Bc2=Bz2-By2$
$Bd2=Bz2+By2$ $\Delta Bx12=(Bx2-Bx1)$
$\Delta Bz12=(Bz2-Bz1)$
$\Delta Bc12=(Bc2-Bc1)$
$\Delta Bd12=(Bd2-Bd1)$
---
$\theta main=atan2(\Delta Bx12, K1*\Delta Bz12)$
$\theta aux2a=atan2(\Delta Bx12, K3*\Delta Bc12)$
$\theta aux2b=atan2(\Delta Bx12, K4*\Delta Bd12)$

FIG. 7(e)

Test if: $\theta main \approx (\theta aux2)$,
or test if: $(K1*\Delta Bz12) \approx (K3*\Delta Bc12)$
or test if: $(K1*\Delta Bz12) \approx (K4*\Delta Bd12)$ Optional additional tests:
$(h4+h3) \approx (h1+h2)$?
$(h8+h7) \approx (h5+h6)$?

FIG. 7(f)

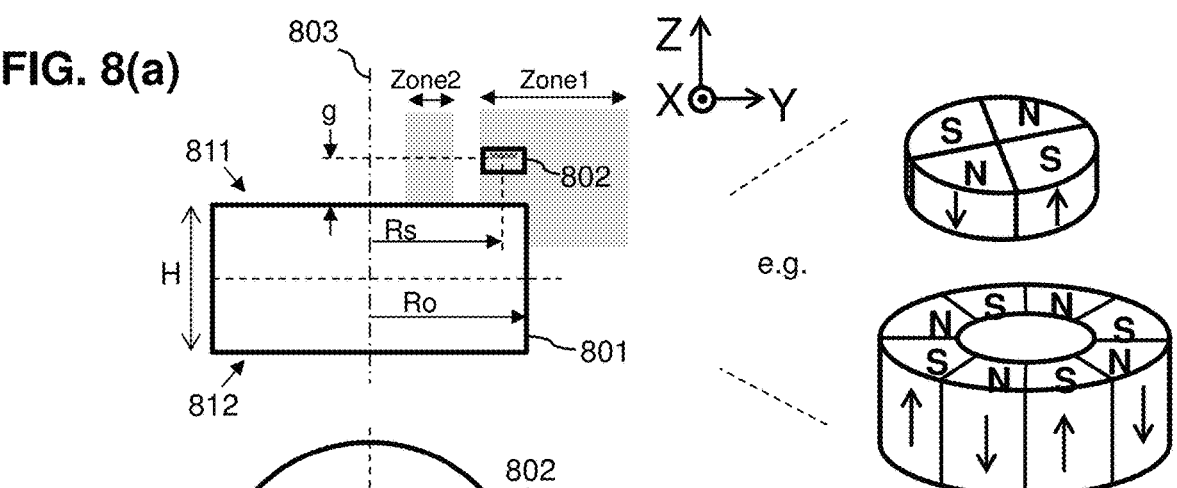

FIG. 8(a)

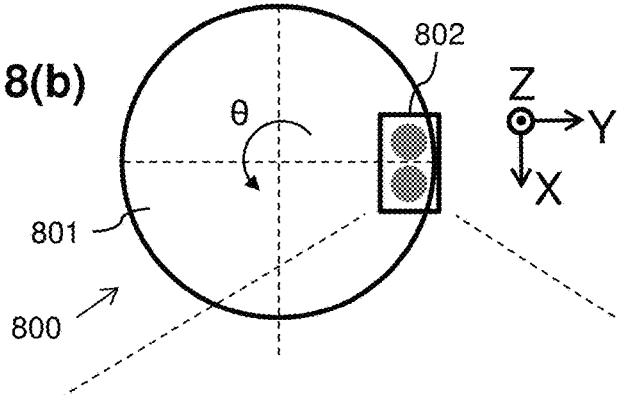

FIG. 8(b)

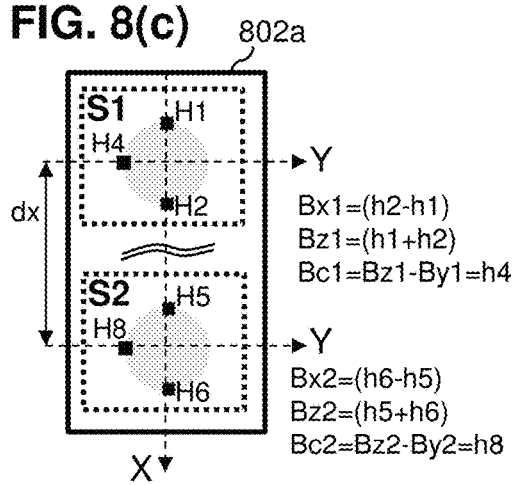

FIG. 8(c)

$Bx1=(h2-h1)$
$Bz1=(h1+h2)$
$Bc1=Bz1-By1=h4$ $Bx2=(h6-h5)$
$Bz2=(h5+h6)$
$Bc2=Bz2-By2=h8$ $\Delta Bx12=(Bx2-Bx1)$
$\Delta Bz12=(Bz2-Bz1)$
$\Delta Bc12=(Bc2-Bc1)$
$\Delta Bd12=(Bd2-Bd1)$
---
$\theta main=atan2(\Delta Bx12, K1*\Delta Bz12)$
$\theta aux2a=atan2(\Delta Bx12, K3*\Delta Bc12)$
$\theta aux2b=atan2(\Delta Bx12, K4*\Delta Bd12)$

FIG. 8(e)

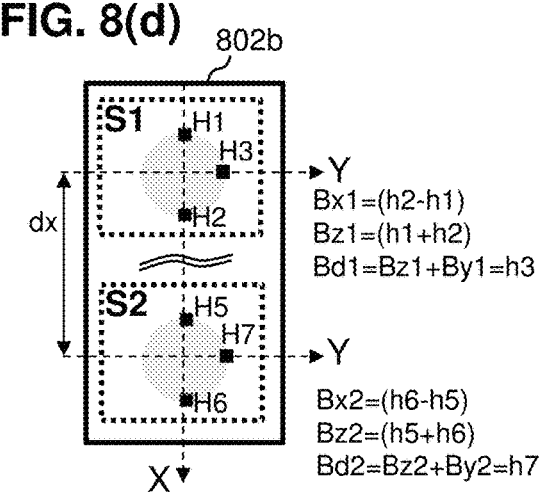

Test if:   $\theta main \approx (\theta aux2)$,
or test if:  $(K1*\Delta Bz12) \approx (K3*\Delta Bc12)$
or test if:  $(K1*\Delta Bz12) \approx (K4*\Delta Bd12)$ Optional additional tests:
$(h4+h3) \approx (h1+h2)$?
$(h8+h7) \approx (h5+h6)$?

FIG. 8(f)

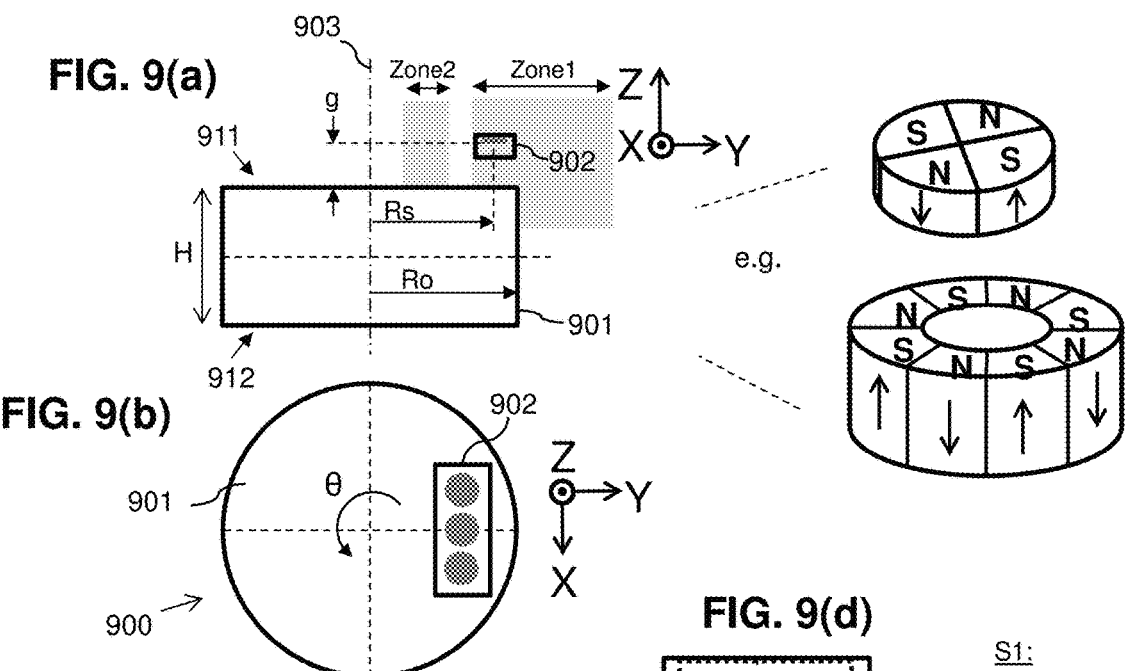
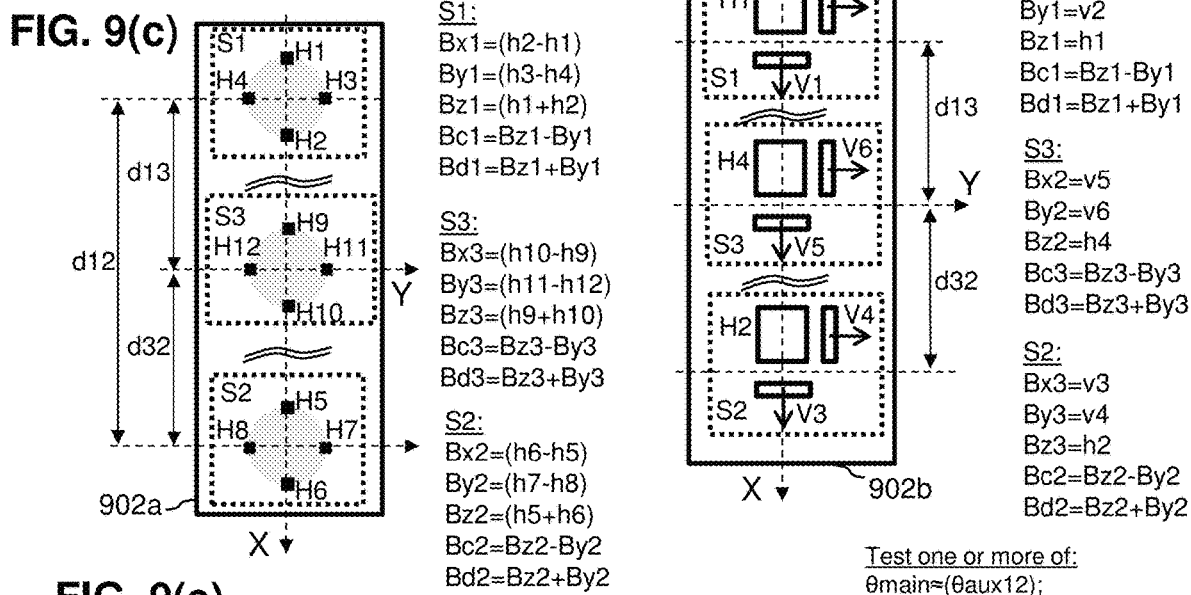

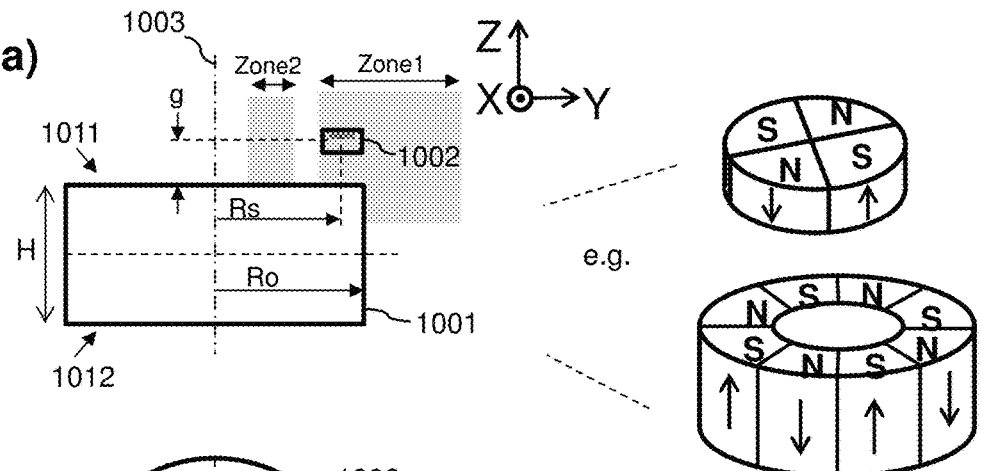
FIG. 10(a)
FIG. 10(b)
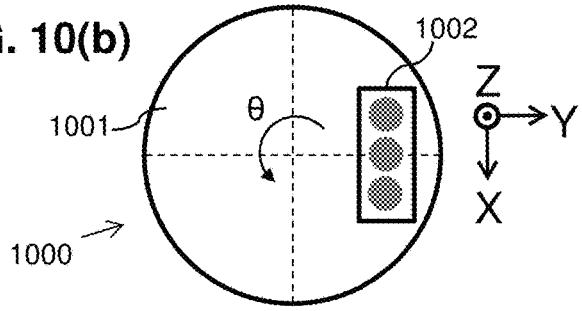
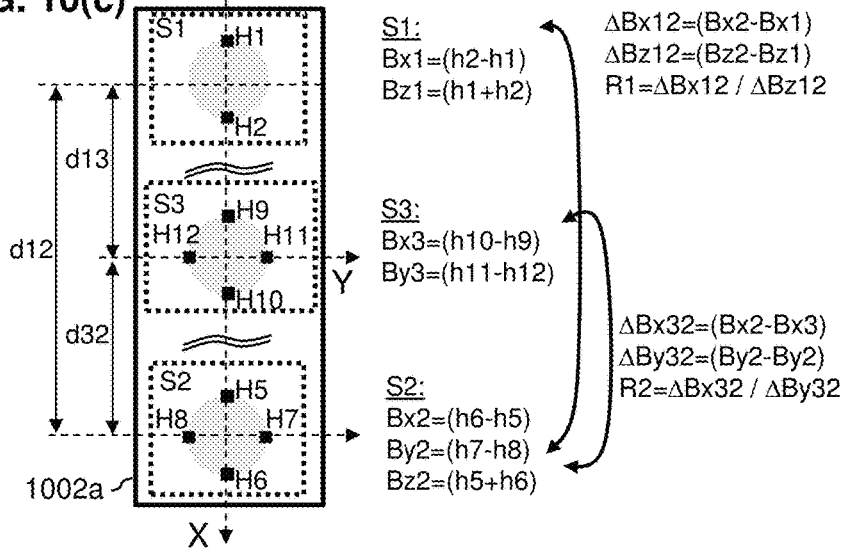
FIG. 10(c)
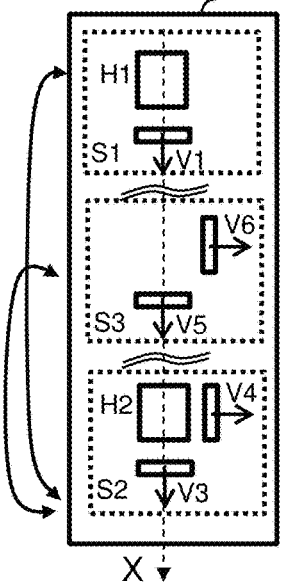
FIG. 10(d)
$\theta_{main} = atan2(\Delta Bx12, \Delta Bz12)$
$\theta_{aux} = atan2(\Delta Bx23, \Delta By23)$   FIG. 10(e)
Test if $\theta_{main} \approx (\theta_{aux})$   FIG. 10(f)

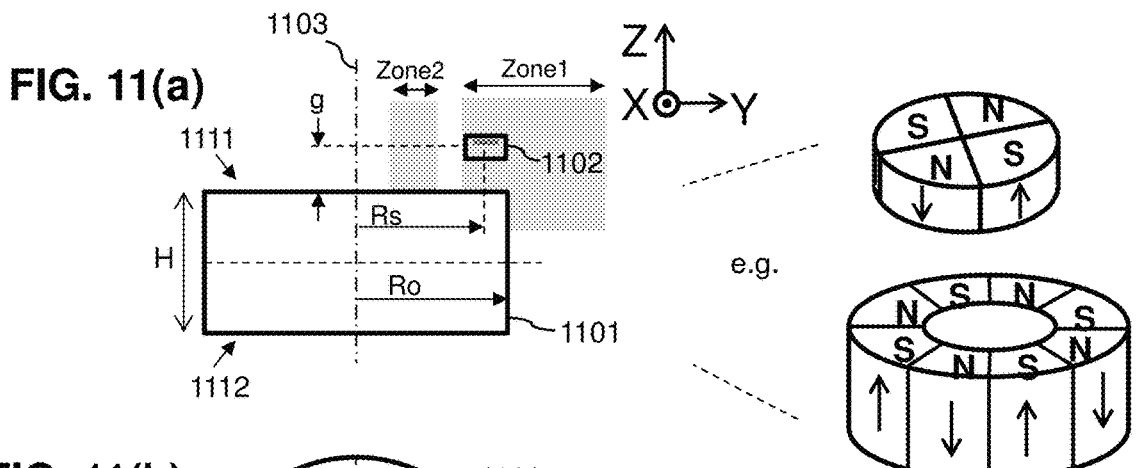
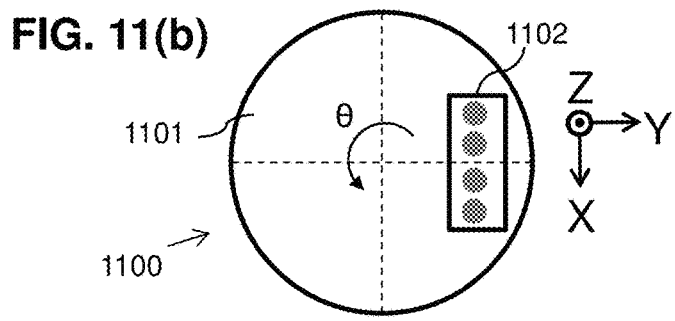
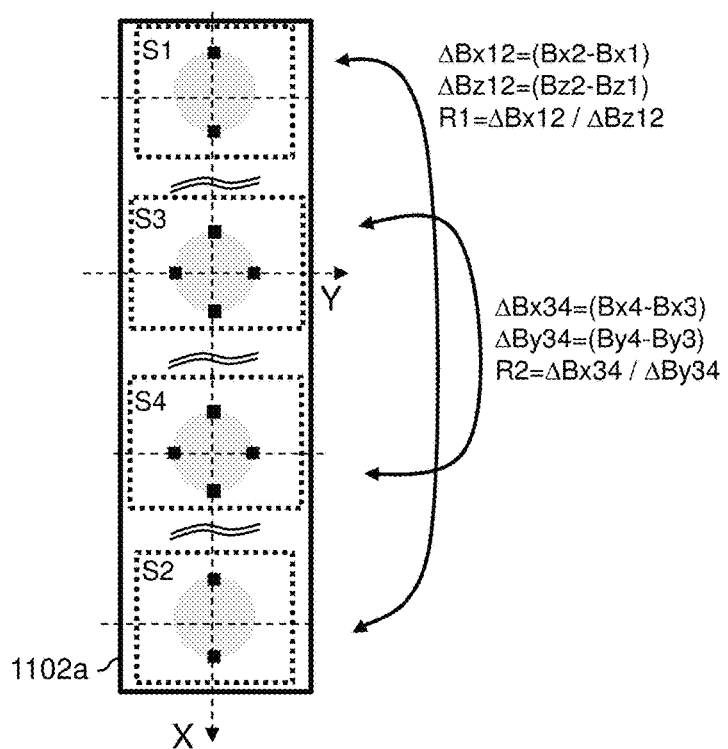
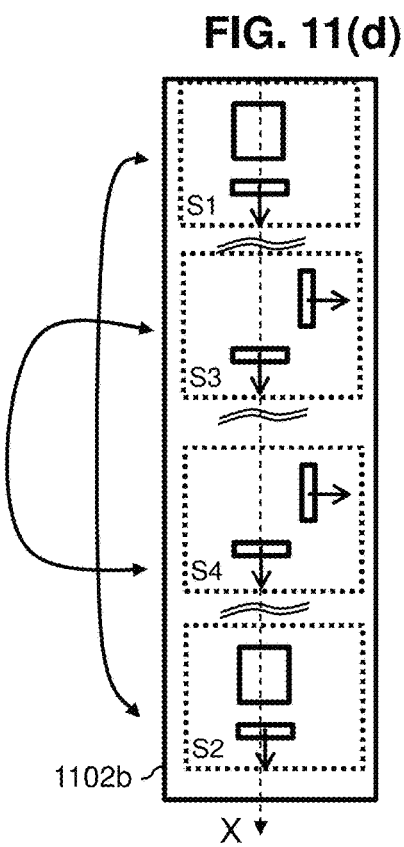
FIG. 11(a)
FIG. 11(b)
FIG. 11(c)
FIG. 11(d)

FIG. 12(a)
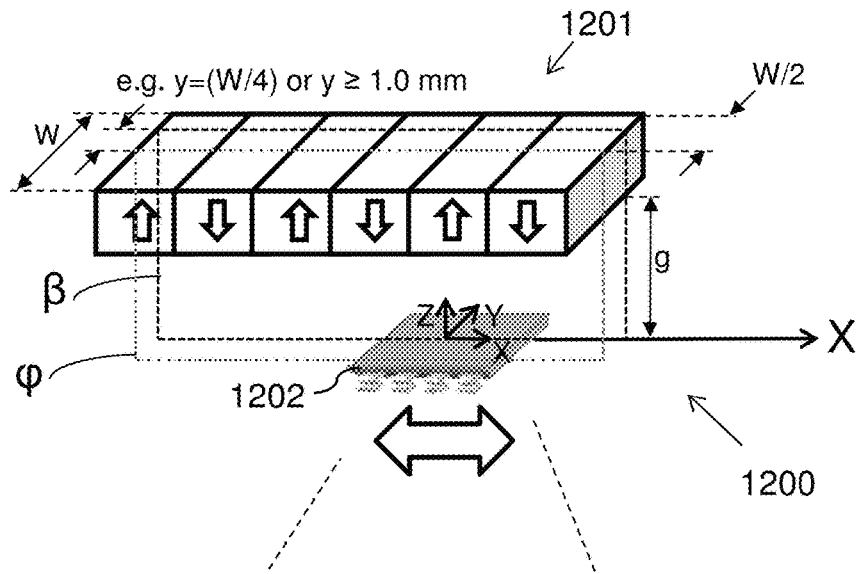
FIG. 12(b)
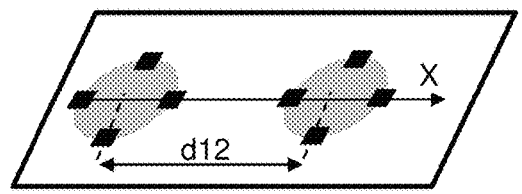
FIG. 12(c)
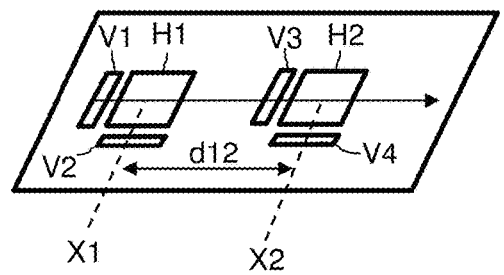
also works with:
FIG. 12(d)
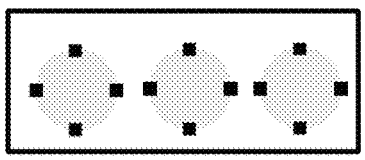
(e)
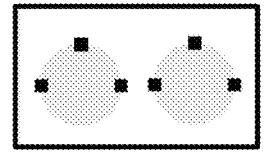
FIG. 12(f)
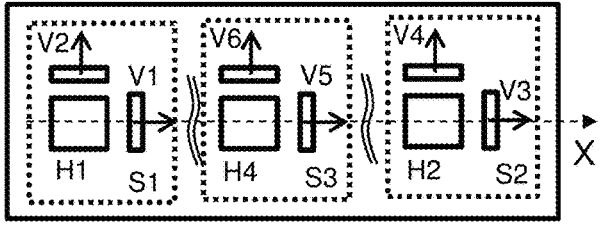

MAGNETIC POSITION SENSOR DEVICE, METHOD AND SYSTEM, WITH ERROR DETECTION

FIELD OF THE INVENTION

The present invention relates in general to the field of magnetic position sensor systems, devices and methods, and more in particular to linear and angular magnetic position sensor systems and devices with error detection capabilities, and methods of determining a linear or angular position and detecting if an error has occurred.

BACKGROUND OF THE INVENTION

Magnetic sensor systems, in particular linear or angular position sensor systems are known in the art. They offer the advantage of being able to measure a linear or angular position without making physical contact, thus avoiding problems of mechanical wear, scratches, friction, etc.

Many variants of position sensor systems exist, addressing one or more of the following requirements: using a simple or cheap magnetic structure, using a simple or cheap sensor device, being able to measure over a relatively large range, being able to measure with great accuracy, requiring only simple arithmetic, being able to measure at high speed, being highly robust against mounting errors, being highly robust against an external disturbance field, providing redundancy, being able to detect an error, being able to detect and correct an error, having a good signal-to-noise ratio (SNR), etc.

Often two or more of these requirements conflict with each other, hence a trade-off needs to be made.

EP3783316(A1) discloses magnetic position sensor systems comprising a magnet or a magnetic structure, and a sensor device movably mounted relative to said magnet or magnetic structure. The systems described in this document, however, do not have error detection capabilities.

There is always room for improvements or alternatives.

SUMMARY OF THE INVENTION

It is an object of embodiments of the present invention to provide a magnetic position sensor system capable of determining a position of a sensor device relative to a magnet or a magnetic structure, and capable of detecting an error, (e.g. an error related to a defective sensor or transducer).

It is also an object of embodiments of the present invention to provide a sensor device specifically adapted for use in such a system.

It is also an object of embodiments of the present invention to provide a method of determining a position of a sensor device relative to a magnet or a magnetic structure, and to provide additional information indicative of an error, and/or allowing the detection of an error by another processor connected to the sensor device.

It is an object of embodiments of the present invention to provide such a system, device and method, wherein the position is determined in a manner which is highly insensitive to an external disturbance field (also known as "stray field"), and wherein also the error detection is highly insensitive to an external disturbance field.

It is an object of embodiments of the present invention to provide such a sensor device in the form of an integrated circuit with a silicon substrate having a reduced area (i.e. a smaller size of the silicon chip), without decreasing the accuracy of the measured position.

It is an object of particular embodiments of the present invention to provide such a sensor device in the form of an integrated circuit with a silicon substrate having a reduced number of sensor elements.

These and other objectives are accomplished by embodiments of the present invention.

According to a first aspect, the present invention provides a position sensor device comprising: a substrate comprising a first and a second magnetic sensor (e.g. S1, S2), spaced apart in a first direction (e.g. X), each magnetic sensor capable of measuring three orthogonal magnetic field components (e.g. Bx, By, Bz) including a first magnetic field component (e.g. Bx) oriented in the first direction (e.g. X), a second magnetic field component (e.g. Bz) oriented in a second direction (vZ) perpendicular to the first direction, and a third magnetic field component (e.g. By) oriented in a third direction (e.g. Y) perpendicular to the first direction and perpendicular to the second direction; a processing circuit connected to said first and second magnetic sensor, and configured for: a) measuring by each of the first and second sensor (e.g. S1, S2), a first magnetic field component (e.g. Bx1, Bx2) oriented in the first direction (e.g. X), and a second magnetic field component (e.g. Bz1, Bz2) oriented in the second direction (e.g. Z), and a third magnetic field component (e.g. By1, By2) oriented in the third direction (e.g. Y); b) determining (e.g. calculating) a first difference (e.g. ΔBx12) between the first magnetic field components (e.g. Bx1, Bx2), and a second difference (e.g. ΔBz12) between the second magnetic field components (e.g. Bz1, Bz2), and a third difference (e.g. ΔBy12; ΔBc12) between the third magnetic field components (e.g. By1, By2 or e.g. Bc1, Bc2); c) determining a first ratio (e.g. R1) of the first difference (e.g. ΔBx12) and the second difference (e.g. ΔBz12) (e.g. in accordance with the formula R1=ΔBx12/ΔBz12), and determining a first angle (e.g. θmain) based on the first ratio (e.g. R1), and outputting the first angle (e.g. θmain); d) determining a second ratio (e.g. R2) of the first difference (e.g. ΔBx12) and the third difference (ΔBy12, ΔBc12), or determining a second ratio (e.g. R2) of the first difference (ΔBx12) (in the nominator) and a linear combination of the third difference (e.g. ΔBy12) and the second difference (e.g. ΔBz12) (in the denominator); e) optionally determining a second angle (e.g. θaux) based on the second ratio (e.g. R2), optionally comparing the first angle (e.g. θmain) and the second angle (e.g. θaux) yielding a first outcome; optionally comparing the first ratio (e.g. R1) and the second ratio (e.g. R2) yielding a second outcome; and outputting at least one of: the second angle (e.g. θaux), the first and the second ratio (e.g. R1, R2), a diagnostic signal based on the first outcome and/or the second outcome.

It is a major advantage of this embodiment that both the first angle (also referred to herein as "main angle") as well as the second angle (also referred to herein as "auxiliary angle") is calculated based on difference signals (or gradients), because these difference signals are highly robust against an external magnetic disturbance field. The same applies to the first and the second ratio itself.

It is a major advantage of this embodiment that the first angle is calculated based on a ratio of two difference signals (or gradients), because this ratio is highly robust against temperature variations, demagnetization effects, the distance between the magnet and the sensor device.

It is a major advantage of this embodiment that it offers the ability of error detection, without doubling the number of magnetic sensor elements, thus without doubling the footprint occupied by these sensor elements.

It is a major advantage of embodiments wherein the sensors comprise an integrated magnetic concentrator, that the space occupied by IMC is not doubled, but only increased by 50%, because doubling may have a negative impact on the methods of producing such a device, in particular on the time required for electroplating, and/or on the yield.

The linear combination of step d) may be calculated using the formula: (a*ΔBz12−b*ΔBy12), where a, b are constants, and b is a different from zero. For example, the second ratio can be R2=ΔBx12/ΔBy12, or the second ratio can be R2=ΔBx12/(ΔBz12−ΔBy12), or the second ratio can be R2=ΔBx12/(a*ΔBz12−b*ΔBy12).

Each of the first and second sensor is a "3D magnetic pixel".

In an embodiment, the second magnetic field component is oriented parallel to the substrate, and the third magnetic field component is oriented perpendicular to the substrate.

In another embodiment, the third magnetic field component is oriented parallel to the substrate, and the second magnetic field component is oriented perpendicular to the substrate.

In an embodiment, step d) comprises: determining a second ratio (e.g. R2) of the first difference (e.g. ΔBx12) and the third difference (e.g. ΔBy12); and step e) comprises: determining a second angle (e.g. θaux) based on the second ratio (e.g. R2); and outputting at least one of: the second angle (e.g. θaux), a diagnostic signal based on a comparison of the first angle (e.g. θmain) and the second angle (e.g. θaux).

In this embodiment, the sensor device calculates two angles, and compares them (internally), and outputs a diagnostic signal indicative of an error, based on the comparison of the angles.

In an embodiment, step d) comprises: determining a second ratio (e.g. R2) of the first difference (e.g. ΔBx12) and the third difference (e.g. ΔBy12); and step e) comprises: outputting at least one of: the first and the second ratio (e.g. R1, R2), a diagnostic signal based on a comparison of the first ratio (e.g. R1) and the second ratio (e.g. R2).

In an embodiment, wherein step d) comprises: determining a second ratio (e.g. R2) of the first difference (e.g. ΔBx12) in the nominator, and a linear combination of the third difference (e.g. ΔBy12) and the second difference (e.g. ΔBz12) in the denominator; and step e) comprises: determining a second angle (e.g. θaux) based on the second ratio (e.g. R2); and outputting at least one of: the second angle (e.g. θaux), a diagnostic signal based on a comparison of the first angle (e.g. θmain) and the second angle (e.g. θaux).

In an embodiment, wherein step d) comprises: determining a second ratio (e.g. R2) of the first difference (e.g. ΔBx12) in the nominator, and a linear combination of the third difference (e.g. ΔBy12) and the second difference (e.g. ΔBz12) in the denominator; and step e) comprises: outputting at least one of: the first and the second ratio (e.g. R1, R2), a diagnostic signal based on a comparison of the first ratio (e.g. R1) and the second ratio (e.g. R2).

In an embodiment, the position sensor device comprises only two magnetic sensors.

It is an advantage of this embodiment that it only requires two sensor locations, thus requires less substrate area (e.g. silicon area), as compared to a sensor device comprising three or more sensors spaced apart in the X-direction. Or stated in other words: it is an advantage of this embodiment that the distance between these two sensors (for a given silicon area), can be larger than for existing sensor having more than two sensor locations, thus the difference signals (or gradients) will typically have a larger amplitude, and/or a larger signal-to-noise ratio.

According to a second aspect, the present invention also provides a position sensor device comprising: a substrate comprising a plurality of at least three or at least four magnetic sensors, spaced apart in a first direction (e.g. X), each magnetic sensor (e.g. S1, S2, S3) capable of measuring at least two orthogonal magnetic field components including a first magnetic field component (e.g. Bx) oriented in the first direction (e.g. X), and one or both of a second magnetic field component (e.g. Bz) oriented in a second direction (e.g. Z) perpendicular to the first direction and perpendicular to the substrate, and a third magnetic field component (e.g. By) oriented in a third direction (e.g. Y) perpendicular to the first direction, and parallel to the substrate; a processing circuit connected to said at least three magnetic sensors, and configured for: a) measuring by a first pair (e.g. S1, S2) of said sensors, a first magnetic field component (e.g. Bx1, Bx2) oriented in the first direction (e.g. X), and a second magnetic field component (e.g. Bz1, Bz2) oriented in the second direction (e.g. Z); b) measuring by a second pair (e.g. S3, S2) of said sensors, different from the first pair, a first magnetic field component (e.g. Bx3, Bx2) oriented in the first direction (e.g. X), and a third magnetic field component (e.g. By3, By2) oriented in the third direction (e.g. Y); c) determining (e.g. calculating) a first difference (e.g. ΔBx12) between the first magnetic field components (e.g. Bx1, Bx2) of the first pair, and a second difference (e.g. ΔBz12) between the second magnetic field components (e.g. Bz1, Bz2) of the first pair; d) determining a first ratio (e.g. R1) of the first difference (e.g. ΔBx12) (in the first nominator), and the second difference (e.g. ΔBz12) (in the first denominator, e.g. in accordance with the formula R1=ΔBx12/ΔBz12), and determining a first angle (e.g. θmain) based on the first ratio (e.g. R1), and outputting the first angle (e.g. θmain); e) determining (e.g. calculating) a third difference (e.g. ΔBx32) between the first magnetic field components (e.g. Bx3, Bx2) of the second pair, and a fourth difference (e.g. ΔBy32) between the third magnetic field components (e.g. By3, By2) of the second pair; f) determining a second ratio (e.g. R2) of the third difference (e.g. ΔBx32) and the fourth difference (ΔBy32); g) optionally determining a second angle (e.g. θaux) based on the second ratio (e.g. R2), optionally comparing the first angle (e.g. θmain) and the second angle (e.g. θaux) yielding a first outcome; optionally comparing the first ratio (e.g. R1) and the second ratio (e.g. R2) yielding a second outcome; and outputting at least one of: the second angle (e.g. θaux), the first and the second ratio (e.g. R1, R2), a diagnostic signal based on the first outcome and/or the second outcome.

It is a major advantage of this embodiment that both the first angle (also referred to herein as "main angle") as well as the second angle (also referred to herein as "auxiliary angle") is calculated based on difference signals (or gradients), because these difference signals are highly robust against an external magnetic disturbance field. The same applies to the first and the second ratio itself.

It is a major advantage of this embodiment that the first angle is calculated based on a ratio of two difference signals (or gradients), because this ratio is highly robust against temperature variations, demagnetization effects, the distance between the magnet and the sensor device.

It is a major advantage of this embodiment that it offers the ability of error detection, without doubling the number of magnetic sensor elements, thus without doubling the footprint occupied by these sensor elements.

It is a major advantage of embodiments wherein the sensors comprise an integrated magnetic concentrator, that the space occupied by IMC is not doubled, but only increased by 50%, because doubling may have a negative impact on the methods of producing such a device, in particular on the time required for electroplating, and/or on the yield.

In this embodiment, it is not required that each sensor is a "3D magnetic pixel". For example, in an embodiment with only three magnetic sensors, one of the sensors may be a 2D magnetic pixel sensitive in the X and Z direction, one of the sensors may be a 2D magnetic pixel sensitive in the X and Y direction, and one of the sensors may be a 3D magnetic pixel sensitive in X,Y and Z. As another example, in an embodiment with only four magnetic sensors, two of the sensors (e.g. the outer two sensors) may be a 2D magnetic pixel sensitive in the X and Z direction, one two of the sensors (e.g. the inner two sensors) may be a 2D magnetic pixel sensitive in the X and Y direction.

In an embodiment of the first or second aspect, the first angle may be calculated in accordance with the following formula: $\theta main = a\tan 2(\Delta Bx13, \Delta Bz13)$, where $\theta main$ is the first angle, $\Delta Bx13$ is the first difference, and $\Delta Bz13$ is the second difference.

In an embodiment, the position sensor device comprises only three magnetic sensors, namely said first, second and third magnetic sensor (S1, S2, S3).

It is an advantage of this embodiment that it only requires three sensor locations, thus requires less substrate area (e.g. silicon area), as compared to a sensor device comprising four sensors spaced apart in the X-direction.

In an embodiment, the at least three sensors are located on a straight line.

In an embodiment, the at least three sensors are located at the corners of a triangle or a trapezium.

In an embodiment, the first, second and third sensor are located on a straight line, and the first sensor (e.g. S1) and the second sensor (e.g. S2) are spaced apart by 1.0 to 3.0 mm, or by 1.25 to 2.75 mm, or by 1.5 to 2.5 mm; and the third sensor (e.g. S3) is situated between the first (e.g. S1) and the second sensor (e.g. S2).

The third sensor may be located at a distance of at least 0.3 mm, or at least 0.4 mm from the first and the second sensor.

As an example, the first sensor may be located at X1=0.0 mm, the third sensor may be located at X2=0.4 mm, and the second sensor may be located at X3=2.5 mm. It should come as a surprise that the distance between the first and the second sensor location can be as small as 0.3 mm, especially if each of these sensors comprises an integrated magnetic concentrator having a diameter of about 150 to 250 microns, that bends the field lines in the vicinity of the IMC.

In an embodiment, the first, second and third sensor are located at the corners of a triangle. In a particular embodiment, the triangle has a base, and a height perpendicular to the base, and a ratio of the height over the base (H/B) is smaller than 20%. In another or a further embodiment, the base has a length in the range from 1.0 to 3.0 mm, or from 1.25 to 2.75 mm, or from 1.5 to 2.5 mm; and has a height smaller than 0.5 mm, or smaller than 0.4 mm, or smaller than 0.3 mm, and the first and the second sensor (S1, S2) are located on the base, and the third sensor is located at the "top".

In an embodiment, the substrate is a semiconductor substrate. Preferably the first, second and third sensor are integrated in the semiconductor substrate.

In an embodiment (of the second aspect), each magnetic sensor is a 3D magnetic pixel (hardware-wise), but the readout-circuit is configured to read-out only some (but not all) magnetic field components of one or more of the magnetic sensors. This offers the advantage that an existing hardware (e.g. layout) can be (re)used. It also provides the advantage that the sensor can be readout faster (at a higher frequency).

In an embodiment (of the second aspect), each magnetic sensor is a 3D magnetic pixel (hardware-wise), and the readout-circuit is configured to read-out all three magnetic field components, but the processing software only uses some (but not all) of these components. This offers the advantage that an existing hardware (e.g. layout) can be (re)used, as well as the readout-scheme, while taking benefit of the advantageous effects of the present invention.

In an embodiment, the position sensor device comprises only three sensors (e.g. S1, S3, S3), and these sensors are located on a straight line, and one of the sensors (e.g. S3) is situated in the middle between the other two sensors (e.g. S1, S2).

It is an advantage of this embodiment that it provides the same accuracy (for the main angle) as a position sensor device having only the first and the second sensor, but not the third sensor in between; but additionally offers the benefit of error-detection. In particular, this embodiment allows to calculate three angles in a strayfield-immune manner, and the main angle (with high accuracy) should be equal to the average of the two other angles (with slightly lower accuracy, because of the reduced distance $\Delta x$). It is noted, however, that the invention will still work if the third sensor is not located exactly in the middle between the first and the second sensor.

In an embodiment, one or more or each of the sensors comprises an integrated magnetic concentrator (IMC) and two (or only two) horizontal Hall element arranged on opposite sides of the IMC.

In an embodiment, one or more or each of the sensors comprises an integrated magnetic concentrator (IMC) and three (or only three) horizontal Hall elements, angularly spaced by multiples of 90°.

In an embodiment, one or more or each of the sensors comprises an integrated magnetic concentrator (IMC) and four (or only four) horizontal Hall elements, angularly spaced by multiples of 90°.

In an embodiment, one or more of the sensors comprises a horizontal Hall element and a single vertical Hall element or a pair of two vertical Hall elements located on opposite sides of the horizontal Hall element.

In an embodiment, one or more of the sensors comprises two vertical Hall elements having directions of maximum sensitivity which are perpendicular to each other.

In an embodiment, each sensor comprises an integrated magnetic concentrator (IMC) and four horizontal Hall elements angularly spaced by multiples of 90°, consisting of a first and a second Hall element (e.g. H1, H2) being spaced apart along the first direction (e.g. X), and a third and a fourth Hall element (e.g. H3, H4) spaced apart in a direction (e.g. Y) perpendicular to the first direction (e.g. X); wherein the first angle is calculated based on signals obtained from the first and the second Hall element (e.g. H1, H2); and wherein the sensor device is further configured to determine a first sum (e.g. sum1) as a sum of the signals obtained from the first and the second Hall element, and to calculate a second sum (e.g. sum2) as a sum of the signals obtained from the third and the fourth Hall element, and to take into account a match of the first sum and the second sum when determining the diagnostic signal.

Or stated in simple terms, in this embodiment, a first sum of the signals of the Hall elements located on the X-axis, and a second sum of the Hall elements located on the Y-axis are compared, and a mismatch of the first and second sum is considered as an indication of an error detection.

According to a third aspect, the present invention also provides a position sensor device comprising: a substrate comprising a first magnetic sensor (e.g. S1) and a second magnetic sensor (e.g. S2), spaced apart along an first axis (e.g. X) extending in a first direction, wherein each magnetic sensor (e.g. S1, S2) comprises an integrated magnetic concentrator (IMC) and only three horizontal Hall elements, including a first (e.g. H1), a second (e.g. H2) and a third (e.g. H3; H4) horizontal Hall element, the first and the second horizontal Hall element (e.g. H1, H2) located on the first axis, the third horizontal Hall element (e.g. H3; H4) being angularly by spaced 90° with respect to the first and second Horizontal Hall element; a processing circuit connected to said first and second magnetic sensor, and configured for: a) measuring by each of the first and second sensor (e.g. S1, S2), a first magnetic field component (e.g. Bx1, Bx2) oriented in a first direction (e.g. X), as a difference of signals (e.g. h1, h2) obtained from the first and second Hall element (e.g. H1, H2); and measuring by each of the first and second sensor (e.g. S1, S2), a second magnetic field component (e.g. Bz1, Bz2) oriented in a second direction (e.g. Z), perpendicular to the first direction, as a sum of signals (e.g. h1, h2) obtained from the first and second Hall element (e.g. H1, H2); and measuring by each of the first and second sensor (e.g. S1, S2), a third value (e.g. Bc1, Bc2), as a signal (e.g. h3) obtained from the third Hall element (e.g. H3); b) determining (e.g. calculating) a first difference (e.g. ΔBx12) between the first magnetic field components (e.g. Bx1, Bx2), and a second difference (e.g. ΔBz12) between the second magnetic field components (e.g. Bz1, Bz2), and a third difference (e.g. ΔBc12) between the third values (e.g. Bc1, Bc2); c) determining a first ratio (e.g. R1) of the first difference (e.g. ΔBx12) and the second difference (e.g. ΔBz12), and determining a first angle (e.g. θmain) based on the first ratio (e.g. R1), and outputting the first angle (e.g. θmain); d) determining a second ratio (e.g. R2) of the first difference (e.g. ΔBx12) and the third difference (e.g. ΔBc12); e) optionally determining a second angle (e.g. θaux) based on the second ratio (e.g. R2), optionally comparing the first angle (e.g. θmain) and the second angle (e.g. θaux) yielding a first outcome; optionally comparing the first ratio (e.g. R1) and the second ratio (e.g. R2) yielding a second outcome; f) outputting at least one of: the second angle (e.g. θaux), the first and the second ratio (e.g. R1, R2), a diagnostic signal based on the first outcome and/or the second outcome.

According to a fourth aspect, the present invention also provides a magnetic position sensor system comprising: a magnetic source for generating a magnetic field having at least two poles; a position sensor device according to the first or second or third aspect, movable relative to said magnetic source, or vice versa.

In an embodiment, the magnetic source is a permanent magnet, rotatable about a rotation axis; and the position sensor device is mounted at a nonzero radial distance (e.g. Rs) from the rotation axis, and is oriented such that the first direction (e.g. X) is tangential to an imaginary circle having a centre on the rotation axis.

Such a position sensor system is commonly referred to as "angular position sensor system".

The magnet may be an axially or diametrically or radially magnetised ring magnet or disk magnet, more in particular, an axially or diametrically two-pole ring or disk magnet, or an axially or radially magnetized ring or disk magnet having more than two poles, for example at least four poles or at least six poles, or at least eight poles.

The magnet may be an axially magnetized two-pole ring or disk magnet.

The magnet may be an axially magnetized ring or disk magnet having a plurality of at least four poles, or at least six poles, or at least eight poles.

In an embodiment, the substrate of the sensor device is oriented perpendicular to the rotation axis, and the magnet has an outer radius (e.g. Ro), and the sensor device is located at a radial position smaller than the outer radius, and at an axial position above a top surface or below a bottom surface of the magnet.

In an embodiment, the substrate of the sensor device is oriented parallel to the rotation axis, and the magnet has an outer radius (e.g. Ro), and the sensor device is located at a radial position smaller than the outer radius, and at an axial position above a top surface or below a bottom surface of the magnet.

In an embodiment, the substrate of the sensor device is oriented perpendicular to the rotation axis, and the magnet has an outer radius (e.g. Ro), and the sensor device is located at a radial position larger than the outer radius, and at an axial position above a top surface or below a bottom surface of the magnet.

In an embodiment, the substrate of the sensor device is oriented parallel to the rotation axis, and the magnet has an outer radius (e.g. Ro), and the sensor device is located at a radial position larger than the outer radius, and at an axial position above a top surface or below a bottom surface of the magnet.

In an embodiment, the substrate of the sensor device is oriented perpendicular to the rotation axis, and the magnet has an outer radius (e.g. Ro), and the sensor device is located at a radial position larger than the outer radius, and at an axial position between the bottom surface and the top surface.

In an embodiment, the substrate of the sensor device is oriented parallel to the rotation axis, and the magnet has an outer radius (e.g. Ro), and the sensor device is located at a radial position larger than the outer radius, and at an axial position between the bottom surface and the top surface.

In an embodiment, the magnetic source is a two-pole magnet, or an elongated structure extending in a longitudinal direction and comprising a plurality of at least two alternating magnetic pole pairs; and the position sensor device is movable in the longitudinal direction, at a nonzero distance from the magnetic source.

Preferably the distance is substantially constant. Preferably the sensor device is oriented with its first direction (X) parallel to the longitudinal direction of the magnetic source.

Such a position sensor system is commonly referred to as "linear position sensor system". Preferably, in this case, the position sensor device is further configured for converting the first angle θ1 into a first linear position, in manners known per se in the art.

Preferably the magnetic position sensor is located in a virtual plane, which is offset from a symmetry plane of the magnetic structure in the Y-direction. With reference to FIGS. 12(a) to 12(f), the offset in the Y-direction is preferably chosen such that the amplitude of the By component generated by the magnetic field (as can be measured by the sensor device) is at least 25% of the amplitude of the Bz component of the magnetic field, and is at least 25% of the amplitude of the Bx component of the magnetic field. The actual offset value depends on the size of the magnetic structure, and the distance ("airgap") between the sensor elements and the magnetic structure and can be determined by simulations.

In an embodiment, the substrate of the sensor device is oriented orthogonal to the orientation of the remanent magnetic field inside the magnetic source, e.g. as illustrated in FIG. 13B.

In an embodiment, the substrate of the sensor device is oriented parallel to the orientation of the remanent magnetic field inside the magnetic source, e.g. as illustrated in FIG. 13C.

In an embodiment, the magnetic position sensor system further comprises a second processor (e.g. ECU) communicatively connected to the position sensor device, and configured for performing one of the following: i) receiving the first angle (e.g. θmain); ii) receiving one or more of: the second angle (e.g. θaux), the first ratio (e.g. R1) and the second ratio (e.g. R2), a diagnostic signal indicative of an error.

In this embodiment, the first processor and the second processor may cooperate to detect if an error has occurred, and/or to take appropriate action at system level. By performing certain functions on two different processors, the probability of detection an error may be further increased.

The second processor may be configured to compare the first and second angle (if the latter is provided), and/or to compare the first ratio and the second ratio (if the ratios are provided).

According to a fifth aspect, the present invention also provides a method of determining a linear or angular position, based on signals obtained from a first and a second sensor (e.g. S1, S2), spaced apart in a first direction (e.g. X), each capable of measuring three orthogonal magnetic field components (e.g. Bx, By, Bz); the method comprising the following steps: a) measuring by each of the first and second sensor (e.g. S1, S2), a first magnetic field component (e.g. Bx1, Bx2) oriented in a first direction (e.g. X), and a second magnetic field component (e.g. Bz1, Bz2) oriented in a second direction (e.g. Z) perpendicular to the first direction (e.g. X), and a third magnetic field component (e.g. By1, By2) oriented in a third direction (e.g. Y) perpendicular to the first and second direction (e.g. X,Z); b) determining (e.g. calculating) a first difference (e.g. ΔBx12) between the first magnetic field components (e.g. Bx1, Bx2), and a second difference (e.g. ΔBz12) between the second magnetic field components (e.g. Bz1, Bz2), and a third difference (e.g. ΔBy12) between the third magnetic field components (e.g. By1, By2) c) determining a first ratio (e.g. R1) of the first difference (e.g. ΔBx12) and the second difference (e.g. ΔBz12) (e.g. in accordance with the formula R1=ΔBx12/ΔBz12), and determining a first angle (e.g. θmain) based on the first ratio (e.g. R1), and outputting the first angle (e.g. θmain); d) determining a second ratio (e.g. R2) of the first difference (e.g. ΔBx12) and the third difference (e.g. ΔBy12, ΔBc12); or determining a second ratio (e.g. R2) of the first difference (e.g. ΔBx12) (in the nominator) and a linear combination of the third difference (e.g. ΔBy12) and the second difference (e.g. ΔBz12) in the denominator); e) optionally determining a second angle (e.g. θaux) based on the second ratio (e.g. R2), optionally comparing the first angle (e.g. θmain) and the second angle (e.g. θaux) yielding a first outcome; optionally comparing the first ratio (e.g. R1) and the second ratio (e.g. R2) yielding a second outcome; and outputting at least one of: the second angle (e.g. θaux), the first and the second ratio (e.g. R1, R2), a diagnostic signal based on the first outcome and/or the second outcome.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE DRAWINGS

FIG. 6(a) and FIG. 6(b) show an angular position sensor system according to an embodiment of the present invention. The system comprises a cylindrical magnet and a magnetic sensor device mounted in an "off-axis position", e.g. as shown in FIG. 5(a).

FIG. 6(c) to FIG. 6(f) illustrate sensor structures and formulas that may be used by the sensor device of FIG. 6(a) to determine an angular position, and to detect an error. This sensor device has two magnetic sensors, each sensor being a 3D magnetic pixel.

FIG. 7(a) to FIG. 7(f) show an angular position sensor system according to an embodiment of the present invention, which can be seen as a variant of FIG. 6(a) to FIG. 6(f). The sensor device has two magnetic sensors, each sensor being a 3D magnetic pixel.

FIG. 8(a) to FIG. 8(f) show an angular position sensor system according to an embodiment of the present invention, which can be seen as a variant of FIG. 7(a) to FIG. 7(f), wherein each sensor comprises an IMC and only three horizontal Hall elements.

FIG. 9(a) to FIG. 9(f) show an angular position sensor system according to an embodiment of the present invention, which can be seen as a variant of FIG. 6(a) to FIG. 6(f). The system comprises a cylindrical magnet and a magnetic sensor device mounted in an "off-axis position", e.g. as illustrated in FIG. 5(a). This sensor device has three magnetic sensors, each sensor being a 3D magnetic pixel.

FIG. 10(a) to FIG. 10(f) show an angular position sensor system according to an embodiment of the present invention, which can be seen as a variant of FIG. 9(a) to FIG. 9(f). The system comprises a cylindrical magnet and a magnetic sensor device mounted in an "off-axis position", e.g. as illustrated in FIG. 5(a). This sensor device has three magnetic sensors, some being a 2D magnetic pixel, some being a 3D magnetic pixel.

FIG. 11(a) to FIG. 11(d) show an angular position sensor system according to an embodiment of the present invention, which can be seen as a variant of FIG. 6(a) to FIG. 6(d). The system comprises a cylindrical magnet and a magnetic sensor device. This sensor device has four magnetic sensors, some being a 2D magnetic pixel, some being a 3D magnetic pixel but being used as a 2D magnetic pixel.

FIG. 12(a) shows a linear position sensor system comprising an elongated magnetic structure with a plurality of alternating poles, and a magnetic sensor device comprising a substrate movable relative to the magnetic structure. The sensor device has a substrate which is perpendicular to the remanent magnetic field inside the magnetic structure. The sensor device is not situated in a symmetry plane of the magnetic structure but is offset in the Y-direction.

FIG. 12(b) to FIG. 12(f) illustrate sensor structures that may be used by the sensor device of FIG. 12(a) to determine a linear position, and to detect an error.

Figure 1:
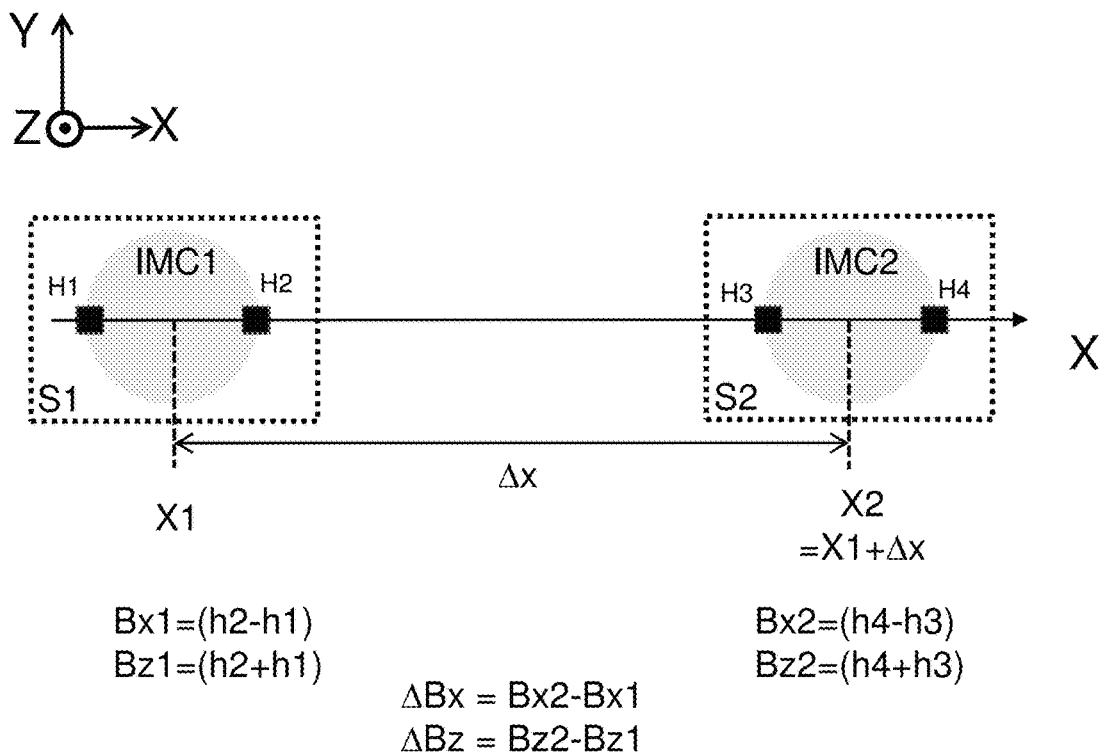
FIG. 1 is a schematic block-diagram of a sensor structure as may be used in embodiments of the present invention. The sensor structure comprises a first sensor at a first sensor location X1, and a second sensor at a second location X2, spaced apart along an X-axis. Each sensor comprises an integrated magnetic concentrator (IMC) and a pair of two horizontal Hall elements arranged on opposite sides of the IMC. Each sensor is a 2D magnetic pixel, capable of measuring a first magnetic field component Bx oriented in the X-direction, and a second magnetic field component Bz perpendicular to the X-axis.

The drawings are only schematic and are non-limiting. In the drawings, the size of some of the elements may be exaggerated and not drawn on scale for illustrative purposes. Any reference signs in the claims shall not be construed as limiting the scope. In the different drawings, the same reference signs refer to the same or analogous elements.

DETAILED DESCRIPTION OF ILLUSTRATIVE EMBODIMENTS

The present invention will be described with respect to particular embodiments and with reference to certain drawings, but the invention is not limited thereto but only by the claims.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

The terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some, but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In this document, unless explicitly mentioned otherwise, the term "magnetic sensor device" or "sensor device" refers to a device comprising at least one "magnetic sensor" or at least one magnetic "sensor element", preferably integrated in a semiconductor substrate. The sensor device may be comprised in a package, also called "chip", although that is not absolutely required. The sensor device preferably contains a semiconductor substrate.

In this document, the term "sensor element" or "magnetic sensor element" or "magnetic sensor" can refer to a component or a group of components or a sub-circuit or a structure capable of measuring a magnetic quantity, such as for example a magneto-resistive (MR) element, a GMR element, an XMR element, a horizontal Hall plate, a vertical Hall plate, a Wheatstone-bridge containing at least one (but preferably four) magneto-resistive elements, etc. or combinations hereof.

Figure 3:
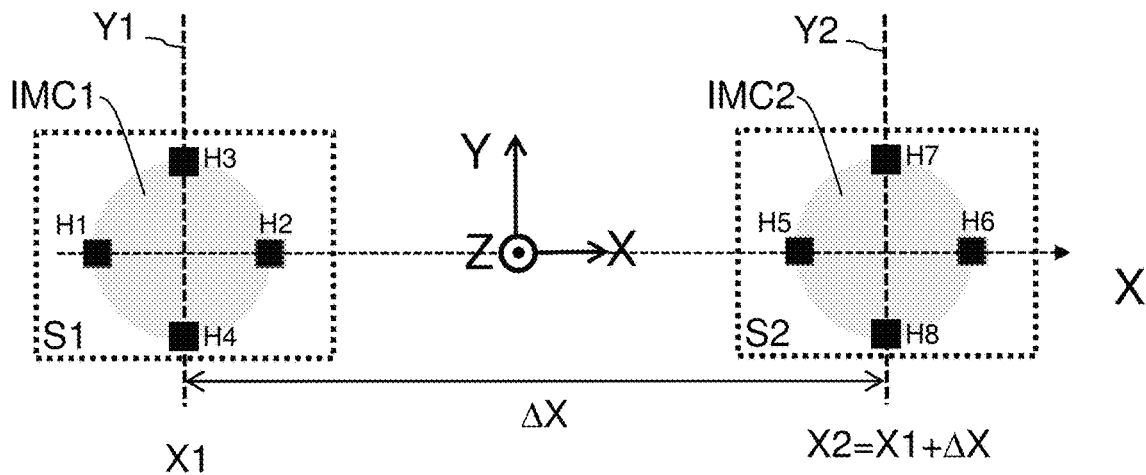
FIG. 3 is a schematic block-diagram of a sensor structure as may be used in embodiments of the present invention. The sensor structure comprises two sensors, each sensor having an integrated magnetic concentrator (IMC) and four horizontal Hall elements arranged near a periphery of the IMC, and angularly spaced by multiples of 90°. Each sensor is a 3D magnetic pixel.

In certain embodiments of the present invention, the term "magnetic sensor" or "magnetic sensor structure" may refer to an arrangement comprising one or more integrated magnetic concentrators (IMC), also known as integrated flux concentrators, and one or more horizontal Hall elements arranged near the periphery of the IMC, for example a disk shaped IMC with two horizontal Hall elements 180° spaced from each other (e.g. as illustrated in FIG. 1), or an IMC with four horizontal Hall elements 90° spaced from each other (e.g. as illustrated in FIG. 3).

In this document, the expression "in-plane component of a magnetic field vector" and "projection of the magnetic field vector in the sensor plane" mean the same. If the sensor device is or comprises a substrate, this also means "magnetic field components parallel to the substrate".

In this document, the expression "out-of-plane component of a vector" and "Z component of the vector" and "projection of the vector on an axis perpendicular to the sensor plane" mean the same.

Embodiments of the present invention are typically described using an orthogonal coordinate system which is fixed to the sensor device, and having three axes X, Y, Z, where the X and Y axis are parallel to the substrate, and the Z-axis is perpendicular to the substrate. Furthermore, the X-axis is preferably oriented "parallel to the direction of relative movement" in case of a linear position sensor", or "tangential to the movement trajectory" in case of a curved movement trajectory, or in a "circumferential direction", i.e. tangential to an imaginary circle having a centre located on the rotation axis in case of an angular position sensor system comprising a rotatable magnet. In case of an angular position sensor system, one of the other axes (Y or Z) is preferably oriented parallel to the rotation axis of the magnet.

In this document, the expression "spatial derivative" or "derivative" or "spatial gradient" or "gradient" are used as synonyms. In the context of the present invention, the gradient is typically determined as a difference between two values measured at two locations spaced apart in the X-direction. In theory the gradient is calculated as the difference between two values divided by the distance "dx" between the sensor locations, but in practice the division by "dx" is often omitted, because the measured signals need to be scaled anyway. Hence, in the context of the present invention, the magnetic field difference (ΔBx) and magnetic field gradient dBx/dx are used interchangeably.

In this document, the term "magnitude of a magnetic field component By" means "the maximum of the absolute value of the By-signal over a full 360° (electrical) rotation of the magnet", and likewise for "amplitude of Bx" and "amplitude of Bz".

In this application, horizontal Hall plates are typically referred to by H1, H2, etc., signals from these horizontal Hall plates are typically referred to by h1, h2, etc.; vertical Hall plates are typically referred to by V1, V2, etc.; and signals from these vertical Hall plates are typically referred to by v1, v2, etc.

In the context of the present invention, the formulas arctan(x/y), a tan 2(x,y), arccot(y/x) are considered to be equivalent.

In this application, the expression "the sensor device is located at an axial position, and a radial position", actually means that a central position of the sensors of that device is located at that axial and radial position.

In this document, the notation ΔBx12 is used to indicate the difference of Bx signals obtained from sensor S1 and sensor S2. If there are only two sensors, this can also be written as ΔBx, without explicitly referring to the sensors S1 and S2. The same applies also for other differences, e.g. ΔBy12 and ΔBz12.

In this document, the notation "A B" is used to indicate that "A is approximately equal to B", using a predefined matching criterium, e.g. by subtracting the value of A and B, and comparing the difference with a predefined, suitable threshold; or by dividing the value of A and B, and comparing the ratio with a suitable range (e.g. 100%±5%), but other matching criteria can also be used.

The present invention is related in general to linear and angular magnetic position sensor systems, comprising a sensor device and a magnetic source, e.g. a permanent magnet, e.g. an axially or diametrically or radially magnetized ring or disk magnet, e.g. an axially or diametrically magnetized two-pole ring or disk magnet, or an axially or radially magnetized ring or disk magnet having more than two poles, e.g. at least four poles or at least six poles or at least eight poles. The present invention is also related to linear position sensor systems comprising a sensor device and a magnetic source in the form of a two-pole magnet or an elongated magnetic structure comprising a plurality of alternating poles.

More specifically, the present invention is related to magnetic sensor devices and methods and systems which are robust against an external disturbance field, and which have error detection capabilities.

Referring to the Figures.

FIG. 1 shows a sensor structure comprising a first sensor S1 located at a first location X1 on an X-axis, and a second sensor S2 located at a second location X2 on said X-axis, spaced from X1. Each of the first and second sensor S1, S2 comprises a disk shaped integrated magnetic concentrator (IMC) and two horizontal Hall elements arranged on the X-axis, on opposite sides of the IMC. The first sensor S1 comprises a first horizontal Hall element H1 configured for providing a first signal h1, and a second horizontal Hall element H2 configured for providing a second signal h2. The second sensor S2 comprises a third horizontal Hall element H3 configured for providing a third signal h3, and a fourth horizontal Hall element H4 configured for providing a fourth signal h4.

In order to understand the present invention, it suffices to know that the signals h1 and h2 of the first sensor S1 can be combined to determine both an in-plane magnetic field component Bx1 (parallel to the sensor substrate) and an out-of-plane magnetic field component Bz1 (perpendicular to the sensor substrate). More in particular, the in-plane magnetic field component Bx1 can be calculated by a subtraction of the signals, and the out-of-plane magnetic field component Bz1 can be calculated by a summation of the signals. This can be expressed mathematically as follows:

$$Bx1=(h2-h1) \quad [1]$$

$$Bz1=(h2+h1) \quad [2]$$

Likewise, the in-plane magnetic field component Bx2, and the out-of-plane magnetic field component Bz2 at the second sensor location X2 can be determined, e.g. in accordance with the following formulas:

$$Bx2=(h4-h3) \quad [3]$$

$$Bx2=(h4-h3) \quad [4]$$

And from these values an in-plane magnetic field gradient ΔBx and an out-of-plane magnetic field gradient ΔBz can be determined, e.g. in accordance with the following formulas:

$$\Delta Bx=Bx2-Bx1 \quad [5]$$

$$\Delta Bz=Bz2-Bz1 \quad [6]$$

The value ΔBx can also be referred to as dBx/dx, and the value ΔBz can also be referred to as dBz/dx. As mentioned above, the scaling factor "dx" is typically omitted, because it is constant, and the values obtained from the sensor elements need to be scaled anyway. For this reason, in this application the terms "magnetic field gradient" and "magnetic field difference" mean the same.

It is known that the gradient signals ΔBx, ΔBz are highly insensitive to an external disturbance field.

Figure 2A:
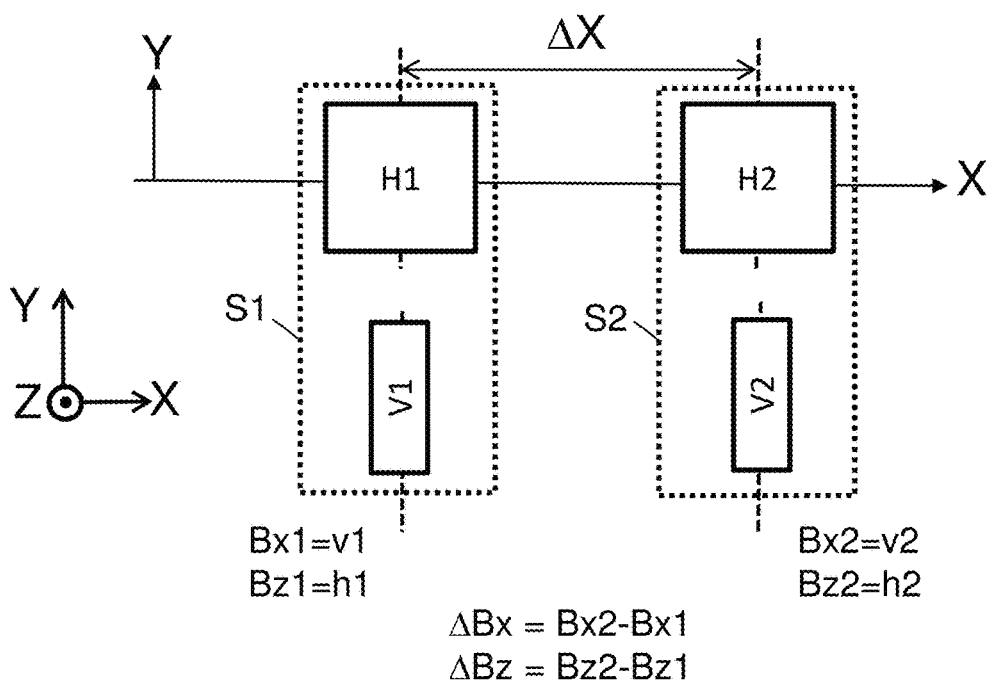
FIG. 2A is a schematic block-diagram of another sensor structure as may be used in embodiments of the present invention.

FIG. 2A is a schematic block-diagram of another sensor structure as may be used, or similar to structures used in embodiments of the present invention. The sensor structure comprises a first sensor at a first sensor location X1, and a second sensor at a second sensor location X2, spaced apart along an X-axis, e.g. by a distance Δx in the range from 1.0 to 3.0 mm, preferably in the range from 1.5 to 2.5 mm. The first sensor S1 comprises a horizontal Hall element H1 and a vertical Hall element V1, and is capable of measuring two orthogonal magnetic field components Bx1 and Bz1. The second sensor S2 comprises a horizontal Hall element H2 and a vertical Hall element V2, and is capable of measuring two orthogonal magnetic field components Bx2 and Bz2. The vertical Hall elements V1, V2 have an axis of maximum sensitivity oriented in the X-direction. The horizontal Hall elements H1, H2 have a direction of maximum sensitivity oriented in the Z-direction. If the sensor elements are integrated in a semiconductor substrate, the magnetic field components Bx1 and Bx2 are parallel to the substrate, whereas the magnetic field components Bz1, Bz2 are perpendicular to the substrate. Two differences or gradients can be derived from these signals, namely ΔB x=Bx2−Bx1 and ΔB z=Bz2−Bz1.

Figure 2B:
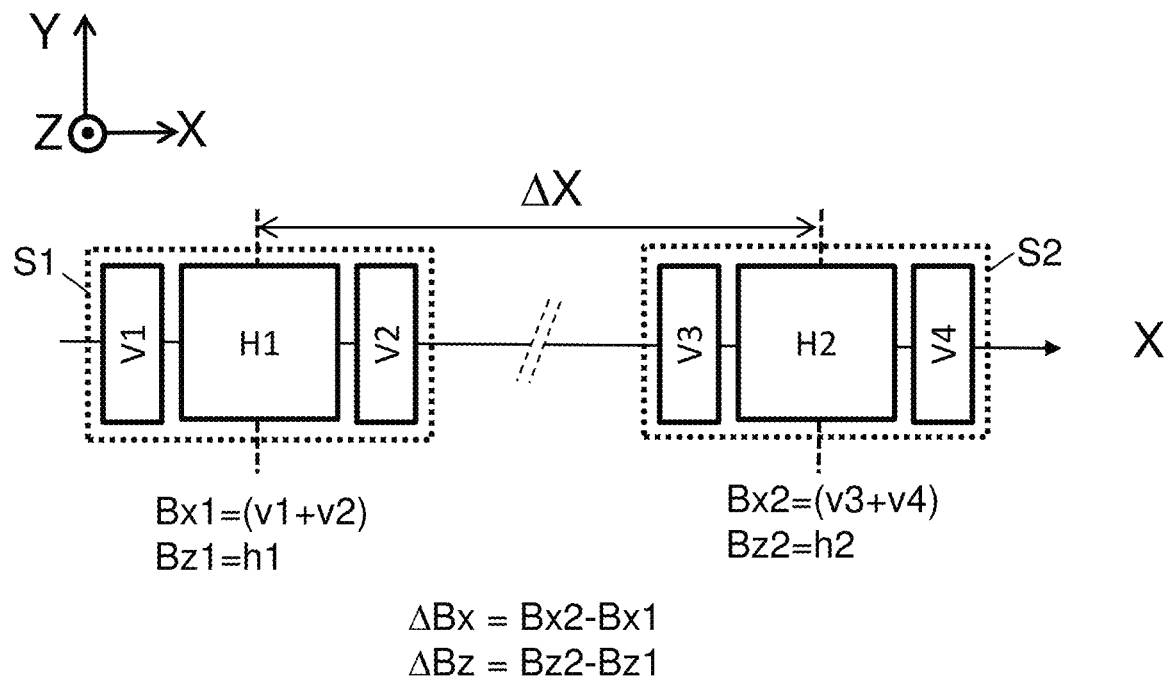
FIG. 2B is a schematic block-diagram of another sensor structure as may be used in embodiments of the present invention.

FIG. 2B is a schematic block-diagram of another sensor structure as may be used, or similar to structures used in embodiments of the present invention. The sensor structure comprises a first sensor S1 at a first sensor location X1, and a second sensor S2 at a second sensor location X2, spaced apart along an X-axis, e.g. by a distance Δx in the range from 1.0 to 3.0 mm, preferably in the range from 1.5 to 2.5 mm. The first sensor S1 comprises a horizontal Hall element H1 and two vertical Hall elements V1, V2, located on opposite sides of the horizontal Hall element H1, and having an axis of maximum sensitivity oriented in the X-direction. Likewise, the second sensor S2 comprises a horizontal Hall element H2 and two vertical Hall elements V3, V4, located on opposite sides of the horizontal Hall element H2, and having an axis of maximum sensitivity oriented in the X-direction. The sum or average of the signals v1 and v2 obtained from the vertical Hall elements V1 and V2 is proportional to the magnetic field component Bx1 at the first sensor location X1. The signal h1 obtained from the horizontal Hall element H1 is proportional to the magnetic field component Bz1 at the first sensor location. Likewise, Bx2= (v3+v4) and Bz2=h2. Two differences or gradients can be derived from these signals, namely ΔBx=Bx2−Bx1 and ΔBz=Bz2−Bz1.

Figure 2C:
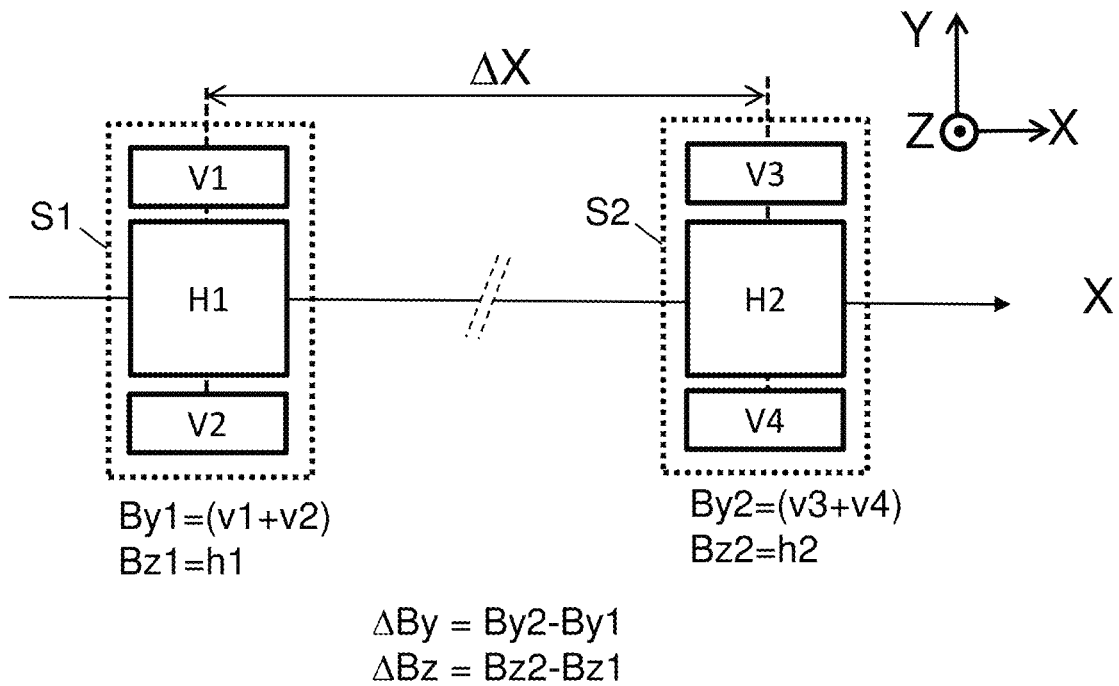
FIG. 2C is a schematic block-diagram of another sensor structure as may be used in embodiments of the present invention.

FIG. 2C is a schematic block-diagram of another sensor structure as may be used, or similar to structures used in embodiments of the present invention. The sensor structure comprises a first sensor S1 at a first sensor location X1, and a second sensor S2 at a second sensor location X2, spaced apart along an X-axis, e.g. by a distance Δx in the range from 1.0 to 3.0 mm, preferably in the range from 1.5 to 2.5 mm. The first sensor S1 comprises a horizontal Hall element H1 and two vertical Hall elements V1, V2, located on opposite sides of the horizontal Hall element H1, and having an axis of maximum sensitivity oriented in the Y-direction, perpendicular to the X-axis but parallel to the substrate in which the sensor elements are implemented. Likewise, the second sensor S2 comprises a horizontal Hall element H2 and two vertical Hall elements V3, V4, located on opposite sides of the horizontal Hall element H2, and having an axis of maximum sensitivity oriented in the Y-direction. Two magnetic field components By1, Bz1 can be measured by the first sensor S1, namely as By1=(v1+v2) and Bz1=h1. Likewise, By2=(v3+v4) and Bz2=h2. Two differences or gradients can be derived from these signals, namely ΔBy=By2− By1 and ΔBz=Bz2−Bz1.

Each of the sensors S1 and S2 of FIG. 1 to FIG. 2C are called a "2D magnetic pixel", because they are capable of measuring two orthogonal magnetic field component values.

FIG. 3 is a schematic block-diagram of a sensor structure as may be used, or similar to structures used in embodiments of the present invention. The sensor structure comprises a first sensor S1 at a first sensor location X1, and a second sensor S2 at a second sensor location X2, spaced apart along an X-axis, e.g. by a distance Δx in the range from 1.0 to 3.0 mm, preferably in the range from 1.5 to 2.5 mm. Each sensor comprises an integrated magnetic concentrator (IMC) and four horizontal Hall elements situated near a periphery of the IMC and spaced apart by multiples of 90°. Two of these horizontal Hall elements are located on the X-axis. Each sensor is a 3D magnetic pixel, capable of measuring three orthogonal magnetic field components, Bx, By, Bz at the respective sensor location. Three differences or gradients can be derived from these signals, namely ΔBx=Bx2−Bx1, ΔBy=By2−By1 and ΔBz=Bz2−Bz1.

Figure 4:
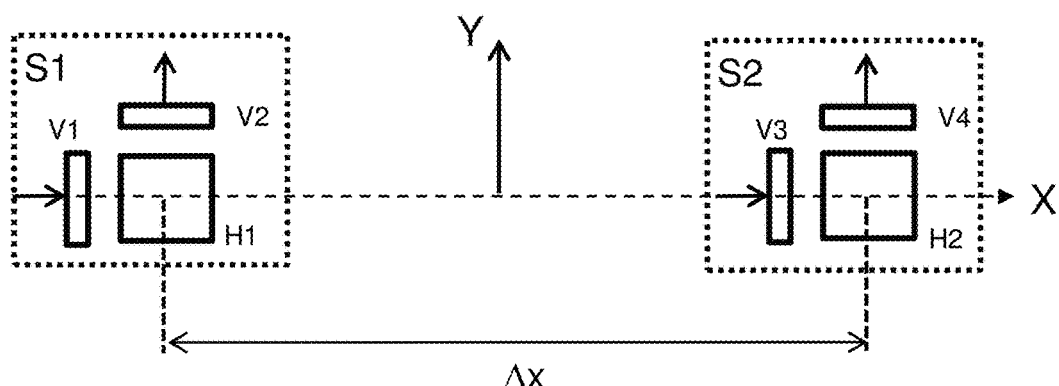
FIG. 4 is a schematic block-diagram of another sensor structure as may be used in embodiments of the present invention. The sensor structure comprises two sensors, each sensor having one horizontal Hall element and two vertical Hall elements oriented in perpendicular directions. Each sensor is a 3D magnetic pixel.

FIG. 4 is a schematic block-diagram of another sensor structure as may be used, or similar to structures used in embodiments of the present invention. The sensor structure comprises a first sensor at a first sensor location X1, and a second sensor at a second sensor location X2, spaced apart along an X-axis, e.g. by a distance Δx in the range from 1.0 to 3.0 mm, preferably in the range from 1.5 to 2.5 mm. Each sensor comprises a horizontal Hall element H1, H2 and two vertical Hall elements having axes of maximum sensitivity oriented in perpendicular directions, namely one in the X-direction and one in the Y-direction. Each sensor is a 3D magnetic pixel, capable of measuring three orthogonal magnetic field components, Bx, By, Bz. Three differences or gradients can be derived from these signals, namely ΔBx=Bx2−Bx1, ΔBy=By2−By1 and ΔBz=Bz2−Bz1.

In a variant of FIG. 4, each sensor has one horizontal Hall element and two pairs of vertical Hall elements, one pair having an axis of maximum sensitivity oriented in the X-direction as in FIG. 2B, and one pair having an axis of maximum sensitivity oriented in the Y-direction as in FIG. 2C. Functionally, this variant also has two 3D magnetic pixels, and is capable of measuring the same signals, but the signal-to-noise ratio (SNR) of the Bx and By signal is better than that of FIG. 4.

Figure 5A:
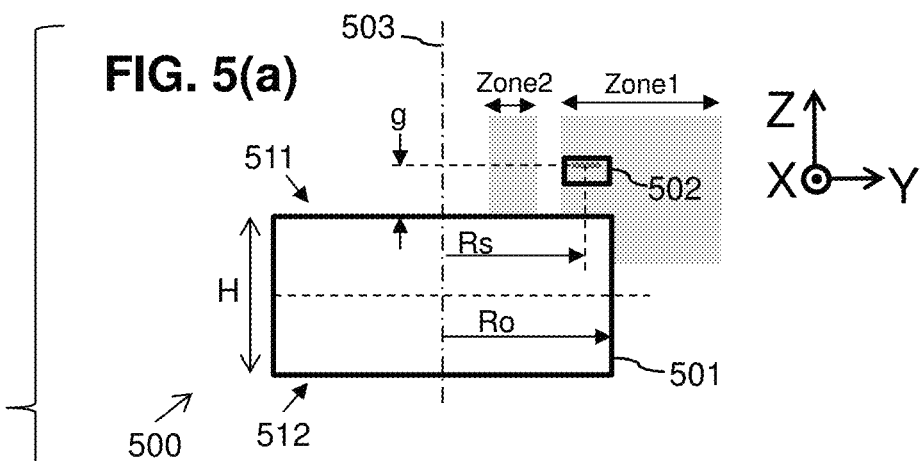
FIG. 5(a) shows an angular position sensor system 500 comprising a cylindrical magnet 501 which is rotatable about a rotation axis, and a sensor device 501 mounted at a radial distance Rs from the rotation axis. The sensor device 501 comprises a substrate which is oriented perpendicular to the rotation axis. A coordinate system with three orthogonal axes X, Y, Z is connected to the substrate, such that X and Y are parallel to the substrate, and Z is perpendicular to the substrate, and such that the X-axis is tangential to a virtual circle having a center located at the rotation axis.

FIG. 5(a) shows an angular position sensor system 500 comprising a cylindrical magnet 501 which is rotatable about a rotation axis 503, and a sensor device 501 mounted at a radial distance Rs from the rotation axis 503. The magnet 501 may be an axially or diametrically or radially magnetized ring or disk magnet, e.g. an axially or diametrically magnetized two-pole ring or disk magnet, or an axially or radially magnetized ring or disk magnet having more than two poles, e.g. at least four poles or at least six poles or at least eight poles. The sensor device 501 comprises a substrate which is oriented perpendicular to the rotation axis 503. A coordinate system with three orthogonal axes X, Y, Z is connected to the substrate of the sensor device, such that X and Y are parallel to the substrate, and Z is perpendicular to the substrate, and such that the X-axis is tangential to a virtual circle having a center located at the rotation axis, and Z is parallel to the rotation axis 503.

Figure 5B:
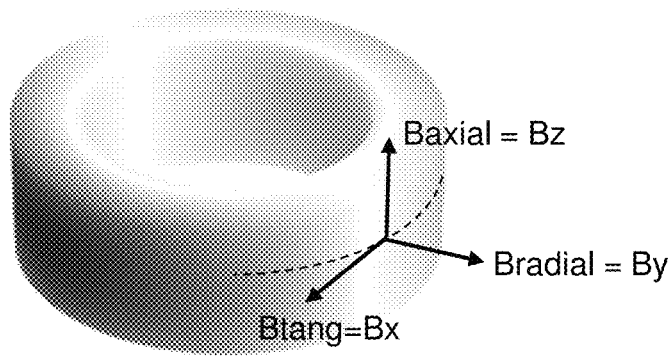
FIG. 5(b) shows how the magnetic field components (Bx, By, Bz) as may be measured by the sensor device of FIG. 5(a) are related to an axial (B axial), a radial (Bradial) and a tangential (Btang) magnetic field component of the magnetic field generated by the magnet.

FIG. 5(b) shows how the magnetic field components (Bx, By, Bz) as may be measured by the sensor device of FIG. 5(a) are related to an axial component B axial, a radial component Bradial and a tangential component B tang of the magnetic field generated by the magnet.

Figure 5C:
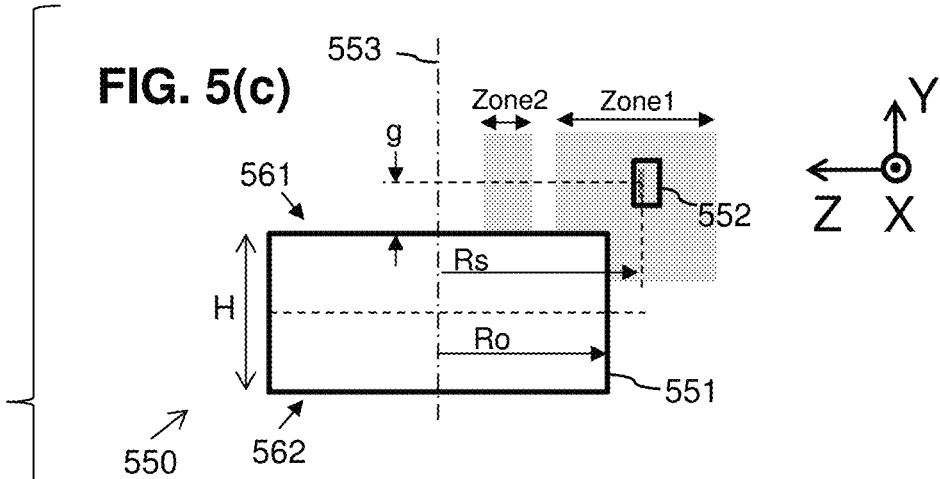
FIG. 5(c) shows an angular position sensor system 550 comprising a cylindrical magnet 551 which is rotatable about a rotation axis, and a sensor device 551 mounted at a radial distance Rs from the rotation axis. The sensor device 551 comprises a substrate which is oriented parallel to the rotation axis. A coordinate system with three orthogonal axes X, Y, Z is connected to the substrate, such that X and Y are parallel to the substrate, and Z is perpendicular to the substrate, and such that the X-axis is tangential to a virtual circle having a center located at the rotation axis.

FIG. 5(c) shows an angular position sensor system 550 comprising a cylindrical magnet 551 which is rotatable about a rotation axis 553, and a sensor device 551 mounted at a radial distance Rs from the rotation axis 553. The magnet 551 may be an axially or diametrically or radially magnetized ring or disk magnet, e.g. an axially or diametrically magnetized two-pole ring or disk magnet, or an axially or radially magnetized ring or disk magnet having more than two poles, e.g. at least four poles or at least six poles or at least eight poles. The sensor device 551 comprises a substrate which is oriented parallel to the rotation axis. A coordinate system with three orthogonal axes X, Y, Z is connected to the substrate of the sensor device, such that X and Y are parallel to the substrate, and Z is perpendicular to the substrate, and such that the X-axis is tangential to a virtual circle having a center located at the rotation axis, and Y is parallel to the rotation axis 553.

Figure 5D:
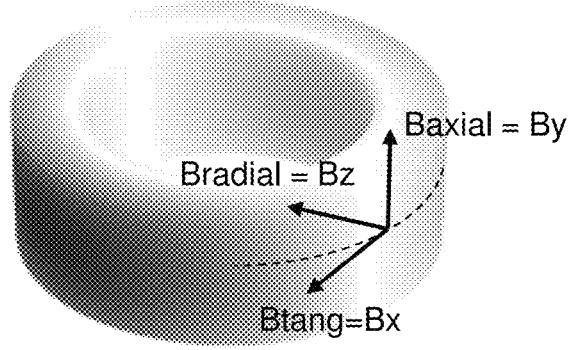
FIG. 5(d) shows how the magnetic field components (Bx, By, Bz) as may be measured by the sensor device of FIG. 5(c) are related to an axial (B axial), a radial (Bradial) and a tangential (Btang) magnetic field component of the magnetic field generated by the magnet.

FIG. 5(d) shows how the magnetic field components (Bx, By, Bz) as may be measured by the sensor device of FIG. 5(c) are related to an axial component B axial, a radial component Bradial and a tangential component Btang of the magnetic field generated by the magnet.

The magnet 501 of FIG. 5(a) is a cylindrical magnet with a top surface 511 and a bottom surface 512. The sensor device 502 is mounted at a distance "g" (also referred to as "air-gap") above the top surface 511 or below the bottom surface 512 of the magnet. The distance "g" may be a value in the range from 0.5 to 5.0 mm. The sensor sensor device 502 is mounted at a radial distance "Rs" from the rotation axis 503 of the magnet. The radial distance Rs is preferably smaller than an outer radius Ro plus 20 mm (Rs<Ro+20 mm). The magnet may have an outer diameter from 4.0 to 30 mm, and a height in the range from 4 mm to 20 mm, but the present invention is not limited thereto.

In embodiments of the present invention, the sensor device is preferably situated at a position around the magnet where the amplitudes of the three magnetic field components Bx, By, Bz are "sufficiently high", or where the amplitudes of the three magnetic field gradients dB x/dx, dB y/dx, dBz/dx are "sufficiently high". With sufficiently high is meant that that the ratio of one of said amplitudes is at least 10% (or at least 15%, or at least 20%, or at least 25%) of the two other amplitudes, For example, if the magnet is an axially magnetized magnet, and the sensor device 502 is located "above the magnet", the components Bx and Bz typically have a relatively large amplitude, but the component By typically has a relatively small amplitude. In preferred embodiments of the present invention, the sensor device is preferably located at a position where the amplitude of By is at least 10% (or at least 15%, or at least 20%, or at least 25%) of the amplitude of Bx and is at least 10% (or at least 15%, or at least 20%, or at least 25%) of the amplitude of Bz, (as the magnet rotates around its axis). This condition is typically not satisfied for Rs approximately equal to 50% of Ro (between "zone1" and "zone2" of FIG. 5(a).

As another example, if the magnet is a radially or diametrically magnetized magnet, and the sensor device is oriented with its substrate perpendicular to the rotation axis, and is situated "near the equator", i.e. at an axial position substantially halfway between the top surface and the bottom surface of the magnet, and at a radial position of e.g. Rs=Ro+10 mm, the amplitude of the signals By and Bx are typically relatively large, but the amplitude of the signal Baxial is typically relatively low. In preferred embodiments of the present invention, the sensor device is preferably located at a position where the amplitude of Bz is at least 10% (or at least 15%, or at least 20%, or at least 25%) of the amplitude of By and is at least 10% (or at least 15%, or at least 20%, or at least 25%) of the amplitude of Bx, (as the magnet rotates around its axis). This condition is typically not satisfied close to the "equator" but is satisfied for an axial position closer to the top surface, or above the top surface.

While explained in terms of the components Bx, By, Bz as can be measured by the sensor device 502, suitable locations where "the amplitudes of the three magnetic field components Bx, By, Bz or the amplitudes of the three magnetic field gradients dBx/dx, dBy/dx, dBz/dx are "sufficiently high" is actually a property of the magnet, and not of the sensor device. Such locations can easily be found by computer simulation, for any given geometry of a disk or ring magnet, but as far as is known to the inventors, no analytical formula exists that describes this zone.

For the sake of describing and understanding the present invention, it is assumed that suitable locations are as schematically indicated by the gray "zone1" and the gray "zone2" of FIG. 5(a). It is not required to know the exact boundaries of these zones, to understand the principles of the present invention.

The same reasoning applies to the angular sensor system of FIG. 5(c). Depending on the particular magnet, there will be potential sensor positions where the amplitude of one of the magnetic field components Bx, By or Bz is smaller than 10% (or smaller than 15%, or smaller than 20%, or smaller than 25%) of the other two amplitudes, or where the amplitude of one of the magnetic field gradients dBx/dx, dBy/dx, dBz/dx is smaller than 10% (or smaller than 15%, or smaller than 20%, or smaller than 25%) of the other two amplitudes, which is undesirable. Again, in preferred embodiments of the present invention, the sensor device is preferably located relative to the magnet at a position where the amplitudes of all three magnetic field components or the amplitudes of all three magnetic field gradients are "sufficiently large". For the sake of describing and understanding the present invention, it is assumed that suitable locations are as schematically indicated by the gray "zone1" and "zone2" of FIG. 5(c). The exact location of the first and second zone depends on the dimensions of the magnet, but the skilled person, having the benefit of the present disclosure, can for any specific magnet, easily find these locations, by measurement in a test-setup, or by performing a computer simulation.

Another underlying principle of the present invention is that it was found that the components Bz and By may either be "in-phase" (0° phase shifted), or in "counter-phase" (180° phase shifted). But in both cases, a first angle can be determined derived from the signals Bx and Bz, and a second angle can be determined derived from the signals Bx and By, and an error can be detected by testing a consistency of the first and the second angle. The above mentioned 180° phase shift is not fully described further, in order not to make the description overly complex, but the skilled reader having the benefit of the present disclosure can easily take it into account.

FIG. 6(a) and FIG. 6(b) show an angular position sensor system 600 in front view and in top view respectively. The angular sensor system 600 comprises a cylindrical magnet 601 and a magnetic sensor device 602 mounted in an "off-axis position". The magnet 601 may be a ring magnet or a disk magnet. The sensor device 602 may be implemented using sensors as shown in FIG. 6(c) or using sensors as shown in FIG. 6(d).

The magnet is a permanent magnet. The magnet has a cylindrical shape with a bottom surface 612 and a top surface 611. The magnet is rotatable about a rotation axis 603. The magnet may be a radially or diametrically magnetized magnet, or an axially magnetized ring or disk magnet having at least four pole pairs (also referred to as quadrupole) or having at least six pole pairs, or having at least eight pole pairs. The magnet has an outer diameter Do, an outer radius Ro, and a height H. If the magnet is a ring magnet, the magnet also has an inner radius Ri.

The sensor device 602 has a substrate, e.g. a semiconductor substrate. An orthogonal coordinate system with three axes X, Y, Z is fixed to the sensor device. The axes X and Y are parallel to the substrate. The axis Z is perpendicular to the substrate. The direction X is tangential to an imaginary circle having a centre located on the rotation axis 603.

The sensor device 602 is mounted in an "off-axis" position relative to the magnet and is oriented such that the substrate is oriented perpendicular to the rotation axis 603 of the magnet.

The sensor device 602 comprises two magnetic sensors: a first sensor S1, and a second sensor S2.

The sensor device 602 is located relative to the magnet 601 such that the first and second sensor S1, S2 are located at an axial distance "g" from the magnet, (in the example: above the top surface 611), and at a radial distance "Rs" from the rotation axis 603. The radial distance Rs is preferably located within the "first zone" or within the "second zone" as described above, where "the amplitudes of the three magnetic field components Bx, By, Bz, or the amplitudes of the three magnetic field gradients dBx/dx, dBy/dx, dBz/dx are sufficiently high", as explained above.

FIG. 6(c) and FIG. 6(d) show two illustrative sensor structures, which may be implemented in the sensor device 602, but the present invention is not limited thereto, and other sensor elements may also be used, for example MR (magneto-resistive) elements.

Each magnetic sensor S1, S2 of the sensor device 601 is capable of measuring three orthogonal magnetic field components, namely: a first magnetic field component Bx oriented in the first direction X, a second magnetic field component Bz oriented in a second direction Z, and a third magnetic field component By.

In FIG. 6(c), six magnetic field components can be determined, as follows:

using signals from S1: $Bx1=(h2-h1)$; $Bz1=(h2+h1)$; $By1=(h3-h4)$;

using signals from S2: $Bx2=(h4-h2)$; $Bz2=(h4+h2)$; $By2=(h7-h8)$;

The sensor device 602 further comprises a processing circuit, which may be configured for performing the following steps:

b) determining 1402 (e.g. calculating) a first difference $\Delta Bx12$ between the first magnetic field components Bx1, Bx2 provided by the first and the second sensor S1, S2; and for determining a second difference $\Delta Bz12$ between the second magnetic field components Bz1, Bz2 provided by the first and the second sensor S1, S2; and for determining a third difference $\Delta By12$ between the third magnetic field components By1, By2 provided by the first and the second sensor S1, S2; and for c) determining 1403 a first ratio R1 of the first difference $\Delta Bx12$ and the second difference $\Delta Bz12$, (e.g. using the formula $R1=\Delta Bx12/\Delta Bz12$), and determining a first angle θmain based on the first ratio R1 (e.g. using the formula: $\theta main = a\tan 2(\Delta Bx12, K1*\Delta Bz12)$, where K1 is a predefined constant), and outputting the first angle (θmain);

d) determining 1404 a second ratio R2 of the first difference $\Delta Bx12$ and the third difference $\Delta By12$ (e.g. using the formula: $R2=\Delta Bx12/\Delta By12$);

e) determining a second angle θaux1 based on the second ratio R2 (e.g. using the formula $\theta aux1 = a\tan 2(\Delta Bx12, K2*\Delta By12)$, where K2 is a predefined constant), comparing the first angle θmain and the second angle θaux1 to verify if they match or not, according to a predefined matching criterium, and outputting a diagnostic signal to indicate whether or not an error is detected, based on the comparison.

Many variants are possible, for example, the sensor device may optionally output the second angle θaux1;

the sensor device may optionally output the first ratio R1 and the second ratio R2;

instead of calculating the second angle, and comparing the first angle and the second angle, the sensor device may compare the first ratio R1 and the second ratio R2, optionally each multiplied by a predefined constant;

the sensor device may not perform the comparison itself, but output the first angle and the second angle, for allowing an external processor (e.g. an ECU, see e.g. FIG. 14) to perform the comparison;

the sensor device may not perform the comparison itself, but output the first ratio R1 and the second ratio R2, for allowing an external processor (e.g. an ECU, see e.g. FIG. 14) to perform the comparison;

if the sensor comprises an IMC and four horizontal Hall elements, an additional test may be performed, thus increasing the probability that an error could be found. Indeed, the component Bz1 can be calculated as (h1+h2) or as (h3+h4) which should (normally) provide approximately the same result. Thus, by testing whether (h1+h2) is approximately equal to (h3+h4), an error related to one of the Hall elements H1 to H4 may be detected. This test is referred to herein as "the Bz-test". A similar test can also be performed for the second sensor S2, by testing whether (h5+h6) is approximately equal to (h7+h8);

and combinations of these.

The angle θmain and θaux1 may be calculated using an arctangent function of the ratio. The angle can also be determined using a look-up table with interpolation.

The steps (b) to (d) can be summarized as: "calculating a first angle θmain based on ΔBx12 and ΔBz12 and calculating a second angle θaux1 based on ΔBx12 and ΔBy12. The first angle (also referred to as "main angle") is the angle to be measured; the second angle (also referred to as "auxiliary angle") can be used to detect an error. The error detection may be performed by the sensor device itself, or may be performed outside of the sensor device, e.g. in an ECU.

Figure 15:
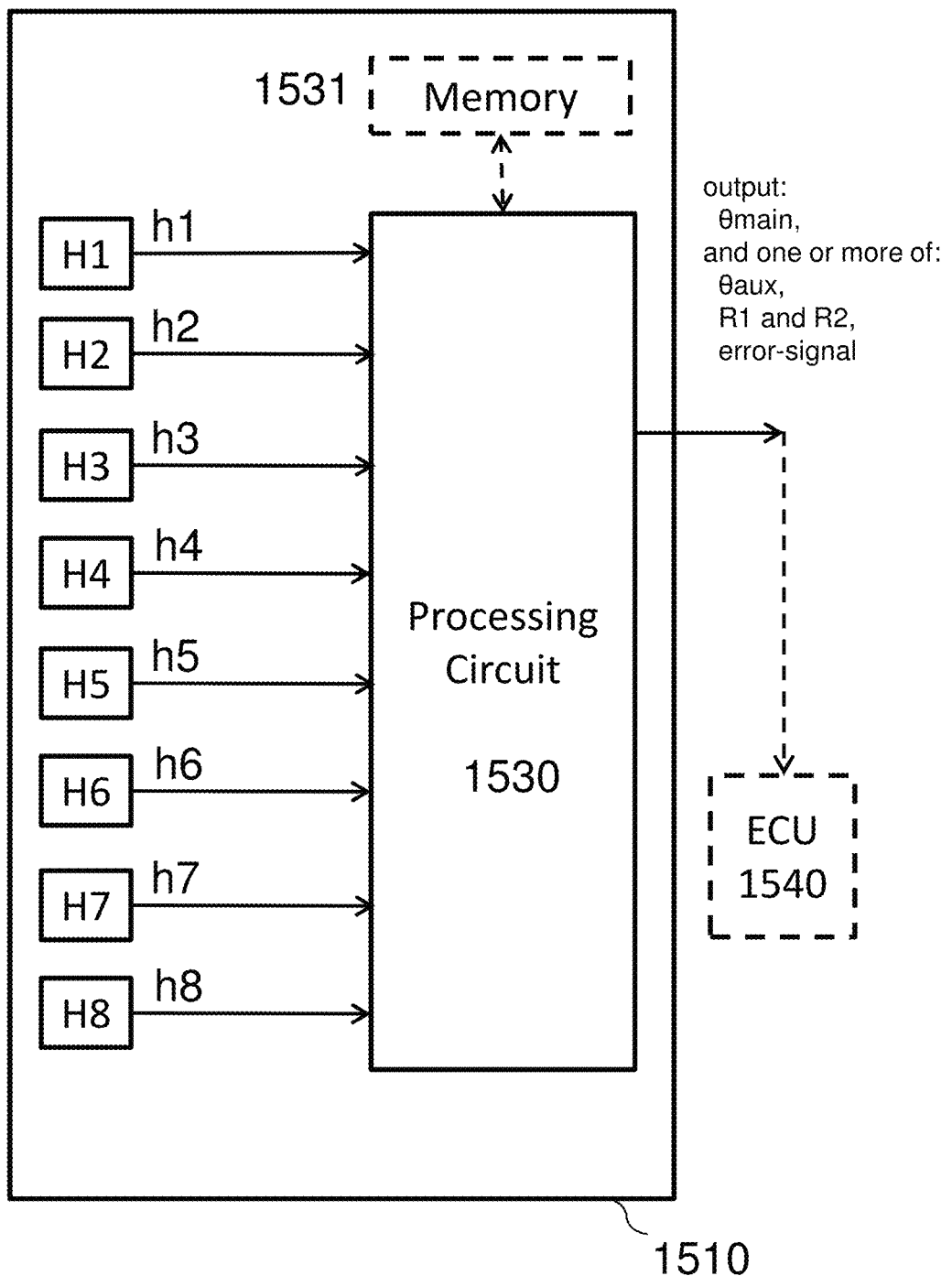
FIG. 15 shows an electrical block-diagrams of circuits that may be used in position sensor devices described above.

The value of K1 and K2 may be determined by performing a calibration test, and may be stored in a non-volatile memory of the sensor device (see e.g. FIG. 15). The value of K1 may be determined as the ratio of the amplitude of Bx and Bz at the radial position Rs; and the value of K2 may be determined as the ratio of the amplitude of Bx and By at the radial position Rs. For completeness it is noted that the use of the factor K1 and K2 may be useful when comparing the first ratio and the second ratio, but is not absolutely required, e.g. in case a post-processing step is used, in which the value determined by the arctangent function is adjusted by a piecewise linear approximation.

In an embodiment, the sensor device may determine and output the diagnostic signal, and optionally also the second angle θaux1. In another embodiment, the sensor device does not perform the error detection itself, and only outputs the first angle θmain and the second angle θaux1, but not a diagnostic signal.

It is important to note that both ratios (and/or both angles) are calculated based on magnetic field differences (or gradients) and are thus highly insensitive to an external disturbance field.

In preferred embodiments, the distance "dx" between the two sensors S1 and S2 is a value in the range from 1.0 to 3.0 mm, or from 1.5 to 2.5 mm, e.g. equal to about 2.2 mm.

So far, mainly the embodiment of a sensor device having a sensor structure as depicted in FIG. 6(*c*) has been described, but the invention is not limited thereto, and a sensor device with a sensor structure as illustrated in FIG. 6(*d*) can also be used. Everything mentioned above for the embodiment with a sensor structure as in FIG. 6(*c*) is also applicable here, the only difference being that the magnetic field components are measured differently. In FIG. 6(*d*), six magnetic field components can be determined, as follows:

using signals from S1: $Bx1=v1$; $Bz1=h1$; $By1=v2$;

using signals from S2: $Bx2=v3$; $Bz2=h2$; $By2=v4$;

But the same formulas for the differences, as mentioned above, can be used here. For example:

$\Delta Bx12=Bx2-Bx1$;

$\Delta Bz12=Bz2-Bz$;

$\Delta By12=By2-By1$;

And the same formula for the main angle θmain and for the auxiliary angle θaux1, as described above, are also applicable for the sensor structure of FIG. 5(*d*).

In a variant (not shown) of the angular sensor system shown in FIG. 6(*a*), the sensor device 602 is oriented such that its substrate is parallel to the rotation axis of the magnet. The same sensor structures as shown in FIG. 6(*c*) and FIG. 6(*d*), and the same formulas as shown in FIG. 6(*e*) and FIG. 6(*f*) can be used to determine an angular position, but the values of K1 and K2, if used, may be different.

FIG. 7(*a*) to FIG. 7(*f*) show an angular position sensor system 700 which can be seen as a variant of the sensor system 600 of FIG. 6(*a*) to FIG. 6(*f*). The angular position sensor system 700 comprises a cylindrical magnet 701 and a magnetic sensor device 702 mounted in an "off-axis position". The sensor device 702 may be implemented using sensors as shown in FIG. 7(*c*) or using sensors as shown in FIG. 7(*d*).

The sensor devices 702a, 702b may use the same sensor structures as the sensor devices 602a, 602b, but instead of calculating θaux1, or in addition to calculating θaux1, this sensor device is configured (or furthermore configured) for calculating an auxiliary angle θaux2a=a tan 2(ΔBx12, K3*ΔBc12), wherein ΔBc12=(Bc2−Bc1), and Bc1=Bz1− By1, and Bc2=Bz2−By2. This is particularly useful when the sensor device is located at a position Rs where the signals Bz and By are in counter-phase. The main idea underlying this embodiment is that the value of Bc1=(Bz1− By1) is larger (in absolute value), and is based on a combination of two measurements, and may have an improved signal-to-noise ratio (SNR) than either of By1 and Bz1. Similarly, the value Bc2 may have an improved SNR as compared to either Bz2 and By2. But more importantly, the SNR of ΔBc12 may be better than the SNR of either ΔBz12 and ΔBy12. When using more accurate signals, the comparison of a match can also be more accurate, and thus the likelihood of detecting of error (and/or avoiding a false mismatch) can be improved.

In case the sensor device is located at a radial position Rs where the signals Bz and By are "in-phase", an auxiliary angle θaux2b can be calculated using the formulas: θaux2b=a tan 2(ΔBx12, K4*ΔBd12), wherein ΔBd12= (Bd2−Bd1), and Bd1=Bz1+By1, and Bd2=Bz2+By2. The main advantage being that the value of Bd1=(Bz1+By1) is larger than By1 and Bz1, and likewise, the value of Bd2=(Bz2+By2) is larger than By2 and Bz2, and thus the value of ΔBd12 may be more accurate than the accuracy of ΔBz12 or ΔBy12.

In an embodiment, the sensor device may calculate the main angle θmain (based on ΔBx and ΔBz), and the auxiliary angle θaux1 (based on ΔBx and ΔBy), and one or both of the auxiliary angles θaux2a (based on ΔBx and ΔBc) and θaux2b (based on ΔBx and ΔBd). Again, it is not really required to calculate angular values in order to detect an error, but it suffices to compare the ratios from which they are derived. Thus, in order to detect an error, one or more of the following tests may be used: test if θmain≈(θaux2), and/or test if (K1*ΔBz12)≈(K3*ΔBc12), and/or test if (K1*ΔBz12)≈(K4*ΔBd12), where K1, K3 and K4 are predefined constants, which may be determined by simulation or during calibration, and may be stored in a non-volatile memory. Alternatively, the values K1, K3, K4 are not used, but the values provided by the arctangent function are post-processed using a piecewise-linear approximation.

In a variant (not shown) of the angular sensor system shown in FIG. 7(a), the sensor device 702 is oriented such that its substrate is parallel to the rotation axis of the magnet. The same sensor structures as shown in FIG. 7(c) and FIG. 7(d), and the same formulas as shown in FIG. 7(e) and FIG. 7(f) may be used to determine an angular position.

FIG. 8(a) to FIG. 8(d) show an angular sensor system 800, which can be seen as a variant of the angular sensor system 700 shown in FIG. 7(a) to FIG. 7(f). The angular sensor system 800 comprises a cylindrical magnet 801 and a magnetic sensor device 802 in an "off-axis position". The sensor device 802 can be implemented using sensors as shown in FIG. 8(c) or using sensors as shown in FIG. 8(d).

The main difference is that the sensors of the device 802a comprises an IMC and only three horizontal Hall elements instead of an IMC with four horizontal Hall elements as in FIG. 7(c). The inventors discovered that it is not really required to measure Bz1 and By1, and to determine Bc1 by subtracting Bz1 and By1, as is done in FIG. 7(c), but the value of Bc1 (or a value proportional thereto) can actually be measured directly by horizontal Hall element H4, as is done in FIG. 8(c). Thus the sensor element H3 can be omitted. Surprisingly the sensor S1 with only three Hall elements can provide the signals Bx1, Bz1 and Bc1. Likewise, the sensor element H7 of FIG. 7(c) can be omitted, yet the sensor S2 with only three Hall elements can provide the signals Bx2, Bz2 and Bc2. The same formulas of FIG. 7(e) to FIG. 7(f) are applicable. Thus, the sensor device 802a is capable of determining a first angle θmain (based on ΔBx and ΔBz), and an auxiliary angle θaux1 (based on ΔBx and ΔBy), and an auxiliary angle θaux2a (based on ΔBx and ΔBc). The device 802a can provide the same advantages as mentioned above: measure a first angle in a manner which is highly insensitive to an external disturbance field and detect an error in a manner which is also highly insensitive to an external disturbance field, but offers the additional advantage that it requires only six horizontal Hall elements, thus requires less biasing, less reading, less digitization, and less processing. The sensor device 802a is very well suited if mounted at a location where the signals Bz and By are "in counter-phase".

The device 802b is very similar to the device 802a, and also contains two sensors, each with an IMC and only three horizontal Hall elements. The device 802b can be seen as a variant of the device 702b of FIG. 7(d) where the sensor elements H4 and H8 are omitted. The sensor device 802a is capable of determining a first angle θmain (based on ΔBx and ΔBz), and an auxiliary angle θaux1 (based on ΔBx and ΔBy), and an auxiliary angle θaux2b (based on ΔBx and ΔBd). The device 802a can provide the same advantages as mentioned above: measure a first angle Δmain in a manner which is highly insensitive to an external disturbance field and detect an error in a manner which is also highly insensitive to an external disturbance field but offers the additional advantage that it requires only six horizontal Hall elements, thus requires less biasing, less reading, less ADC, and less processing. The sensor device 802b is very well suited if mounted at a location where the signals Bz and By are "in phase".

In a variant (not shown) of the angular sensor system shown in FIG. 8(a), the sensor device 802 is oriented such that its substrate is parallel to the rotation axis of the magnet. The same sensor structures as shown in FIG. 8(c) and FIG. 8(d), and the same formulas as shown in FIG. 8(e) and FIG. 8(f) may be used to determine an angular position.

FIG. 9(a) to FIG. 9(f) show an angular position sensor system 900, which can be seen as a variant of the sensor system 600 of FIG. 6(a) to FIG. 6(f). The system 900 also comprises a cylindrical magnet 901 and a magnetic sensor device 902 mounted in an "off-axis position". The sensor device 902 may be implemented using sensors as shown in FIG. 9(c) or using sensors as shown in FIG. 9(d). The main difference between the sensor device 902 and the sensor device 602 is that the sensor device 902 comprises three magnetic sensors S1, S2, S3, each sensor being a 3D magnetic pixel.

The three sensors may be located on a straight line, but that is not absolutely required. The three sensors may be spaced equidistantly, but that is not absolutely required either.

In an alternative embodiment, the three sensors are located at the corners of a triangle (not shown). In a particular embodiment, the triangle has a base (B), and a height (H) perpendicular to the base, and a ratio of the height over the base (H/B) is smaller than 20%. In another or a further embodiment, the base has a length in the range from 1.0 to 3.0 mm, or from 1.25 to 2.75 mm, or from 1.5 to 2.5 mm; and has a height smaller than 0.5 mm, or smaller than 0.4 mm, or smaller than 0.3 mm, and the first and the second sensor S1, S2 are located on the base, and the third sensor is located at the "top". The triangle may be an isosceles triangle, but that is not absolutely required.

The formulas described above, which in FIG. 6(a) to FIG. 7(f) were applicable for two sensors, can also be applied in the device of FIG. 9(a), but three times: for S1 and S2 (also referred to as "the outer sensors"), for S1 and S3, and for S2 and S3. As can be seen in FIGS. 9(a) to 9(f), this results in a large number of tests that may be performed to detect an error.

It should be noted in this respect, that the main angle (which is output), is preferably calculated using difference signals ΔBx12 and ΔBz12 obtained from the two outer sensors S1 and S2, which are spaced apart the most.

It can be appreciated that an angle (e.g. θaux13a or θaux13b) derived from signals obtained from the sensors S1 and S3, for example, will be slightly offset from an angle (e.g. θaux32a or θaux32b) derived from signals obtained from the sensors S2 and S3, and will also slightly deviate from the main angle. However, if the three sensors are located on a straight line and are equidistantly spaced such that S3 is situated in the middle between S1 and S2, the average of θaux13a and θaux32a will typically not be offset with respect to the main angle.

In a particular embodiment where the three sensors are located on a straight line, and where the third sensor S3 is located in the middle between the first and the second sensor, an auxiliary angle θaux4, not yet described above, can be calculated using the formula:
θaux4=a tan 2[(ΔBx32−ΔBx13),K10*(ΔBz32−ΔBz13)], and another angle θaux5 can be calculated using the formula: θaux5=a tan 2[(ΔBx32−ΔBx13),K11*(ΔBy32−ΔBy13)], where K10 and K11 are predefined constants, which can be determined by simulation or calibration, but are not absolutely required as already described above. These angles θaux4 and θaux5 should provide the same result as the main angle θmain, without an offset.

In a variant (not shown) of the angular sensor system shown in FIG. 9(a), the sensor device 902 is oriented such that its substrate is parallel to the rotation axis of the magnet. The same sensor structures as shown in FIG. 9(c) and FIG. 9(d), and the same formulas as shown in FIG. 9(e) and FIG. 9(f) may be used to determine an angular position.

FIG. 10(a) to FIG. 10(f) show an angular position sensor system 1000, which can be seen as a variant of FIG. 9(a) to FIG. 9(f). The angular position sensor system 1000 comprises a cylindrical magnet 1001 and a magnetic sensor device 1002 mounted in an "off-axis position". The sensor device 1002 may be implemented using sensors as shown in FIG. 10(c) or using sensors as shown in FIG. 10(d). The main difference between the sensor device 1002 and the sensor device 902 is that the sensor device 1002 has three magnetic sensors, but some are a 2D magnetic pixel, and some are a 3D magnetic pixel.

In the example shown, a main angle θmain is determined based on difference signals ΔBx12 and ΔBz12 derived from signals provided by the first and second sensor S1, S2; and an auxiliary angle Δaux is determined based on difference signals ΔBx23 and ΔBy23 provided by the second and third sensor S2 and S3. As mentioned above, it is not actually required to calculate angles in order to detect an error, but it suffices to compare a first and second ratio.

The sensor device 1002a of FIG. 10(c) has one 2D magnetic pixel and two 3D magnetic pixels. The sensor device 1002b of FIG. 10(d) has two 2D magnetic pixels and one 3D magnetic pixel.

In a variant (not shown) of the angular sensor system shown in FIG. 10(a), the sensor device 1002 is oriented such that its substrate is parallel to the rotation axis of the magnet. The same sensor structures as shown in FIG. 10(c) and FIG. 10(d), and the same formulas as shown in FIG. 10(e) and FIG. 10(f) may be used to determine an angular position.

FIG. 11(a) to FIG. 11(d) show an angular position sensor system 1100, which can be seen as another variant of the sensor system of FIG. 9(a) to FIG. 9(f). The angular position sensor system 1100 comprises a cylindrical magnet 1101 and a magnetic sensor device 1102 mounted in an "off-axis position". The sensor device 1102 may be implemented using sensors as shown in FIG. 11(c) or using sensors as shown in FIG. 11(d). The main difference between the sensor device 1102 and the sensor device 902 is that the sensor device 1102 has four magnetic sensors S1 to S4, which may be 2D magnetic pixels or 3D magnetic pixels, or a mix thereof. The sensor device 1102a of FIG. 11(c) has two 2D magnetic pixels and two 3D magnetic pixels. The sensor device 1102b of FIG. 11(d) has four 2D magnetic pixels. The same or similar formulas as described above are also applicable here, mutatis mutandis. The device 1102 is capable of determining an angular position, and of detecting an error, or to provide signals for allowing an external processor to detect an error.

In a variant (not shown) of the angular sensor system shown in FIG. 11(a), the sensor device 1102 is oriented such that its substrate is parallel to the rotation axis of the magnet. The same sensor structures as shown in FIG. 11(c) and FIG. 11(d), may be used to determine an angular position.

FIG. 12(a) shows a linear sensor system 1200 comprising an elongated magnetic structure 1201 comprising a plurality of alternating poles, and a magnetic sensor device 1202 comprising a substrate movable relative to the magnetic structure. The sensor device 1202 has a substrate which is oriented perpendicular to the remanent magnetic field inside the magnetic structure.

The sensor device 1102 is preferably situated at a transverse position (in the Y-direction) which is offset from the middle of the magnetic structure. Preferably the transverse offset is at least 0.5 mm, or at least 1.0 mm, but an offset in the range from 0.5 mm to 5.0 mm, or from 1.0 mm to 4.0 mm.

The same sensor structures and the same formulas can be used as described above, in FIG. 6(a) to FIG. 11(d). Besides determining an angular position, the processing circuit of the linear sensor device 1202 would typically be configured to furthermore convert the angular position to a linear position, in known manners, e.g. using a multiplication factor, and in case the magnet has a plurality of poles, by taking into account the pole pitch.

Figure 13A:
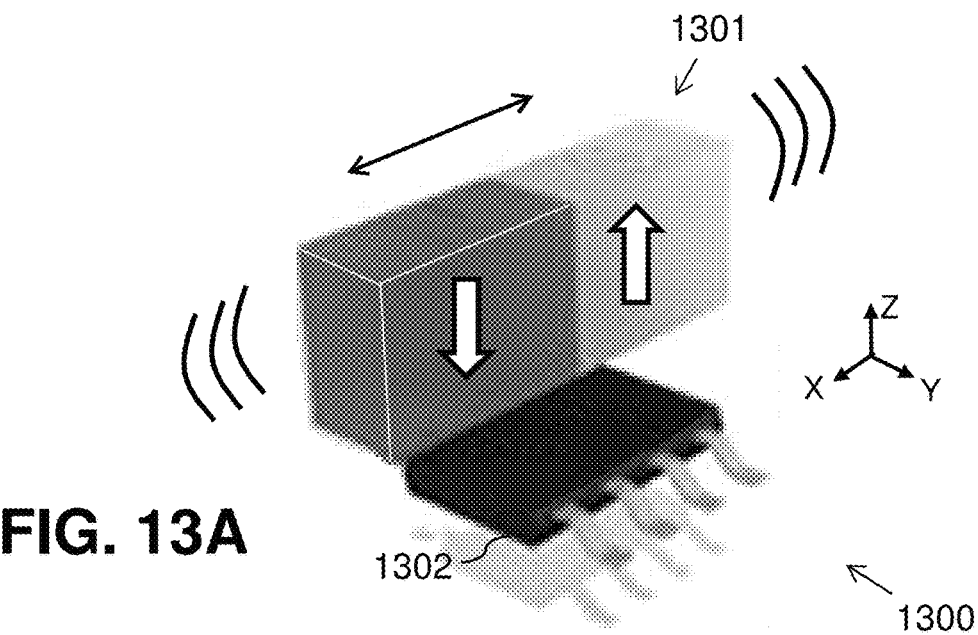
FIG. 13A to FIG. 13C illustrate variants of the linear position sensor system of FIG. 12(a) to FIG. 12(f), wherein the magnet is a two-pole magnet.

FIG. 13A illustrates a linear position sensor system 1300 which can be regarded as a special case or a variant of the linear position sensor system 1200 of FIG. 12(a), wherein the magnet 1301 is a two-pole magnet instead of a magnetic structure comprising a plurality of alternating poles.

Figure 13B:
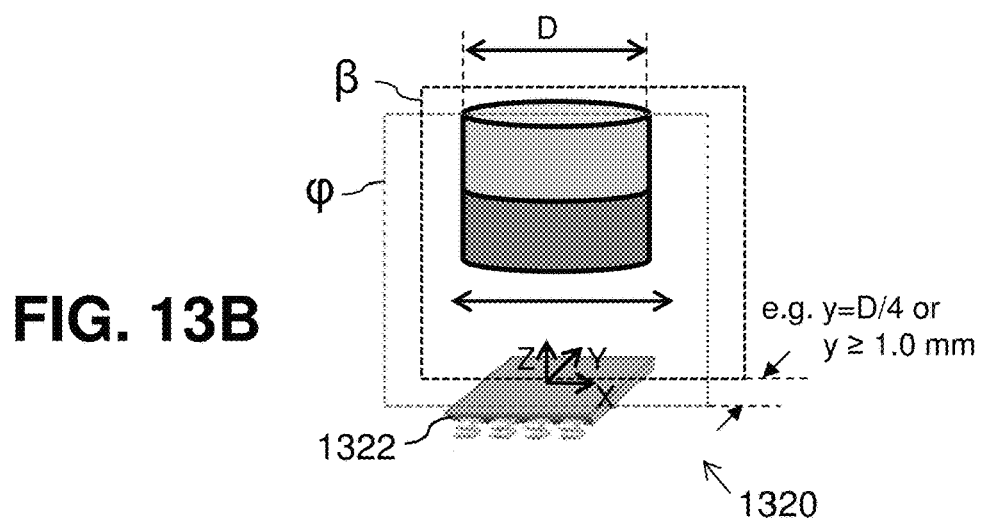

FIG. 13B shows a linear position sensor system 1320 which can be regarded as another variant of the linear position sensor system 1200 of FIG. 12(a).

Figure 13C:
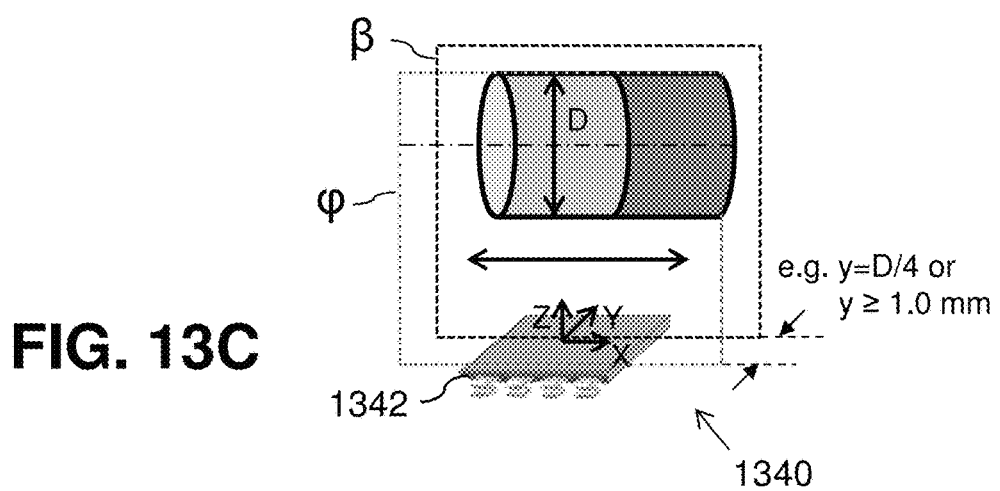

FIG. 13C shows a linear position sensor system 1340 which can be regarded as yet another variant of the linear position sensor system 1200 of FIG. 12(a).

In all embodiments of FIG. 13A to FIG. 13C, the sensor device is movable with respect to the magnet in the X-direction, or the magnet is movable relative to the sensor device along the X-direction, and the sensor device can determine a linear position, and can detect an error, in a manner which is highly insensitive to an external disturbance field.

Figure 14:
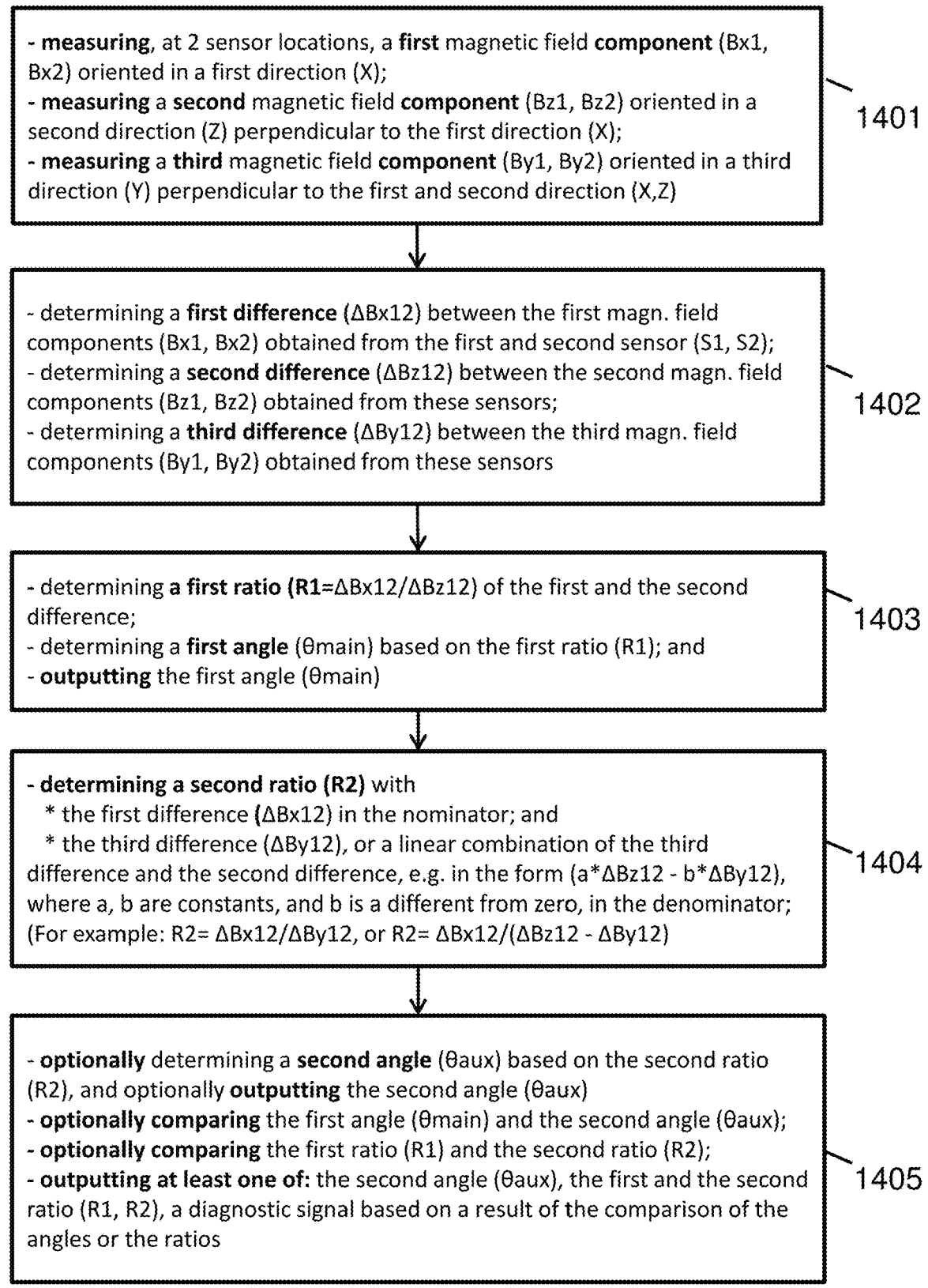
FIG. 14 is a flow-chart of a method proposed by the present invention, which can be performed by the sensor device of FIG. 6(a) or FIG. 7(a) or FIG. 8(a) or FIG. 9(a) and FIG. 12(a). A variant of this method can be applied by the sensor devices of FIG. 10(a) and FIG. 11(a).

FIG. 14 shows a flow chart of a method 1400 which may be performed by the position sensor device 602 of the angular position sensor system 600, or variants thereof. The sensor device 602 comprises a substrate having two sensors S1, S2, which are spaced apart in the X-direction. Each of these sensors are capable of measuring three orthogonal magnetic field components Bx, By, Bz. The method comprises the following steps:

a) measuring 1401 by each of the first and second sensor S1, S2 a first magnetic field component Bx1, Bx2 oriented in the first direction X, and measuring a second magnetic field component Bz1, Bz2 oriented in a second direction Z perpendicular to the first direction X, and measuring a third magnetic field component By1, By2 oriented in a third direction Y perpendicular to the first and second direction X, Z;

b) determining 1402 a first difference ΔBx12 between the first magnetic field components Bx1, Bx2; and determining a second difference ΔBz12 between the second magnetic field components Bz1, Bz2; and determining a third difference ΔBy12 between the third magnetic field components By1, By2;

c) determining 1403 a first ratio R1 of the first difference ΔBx12 and the second difference ΔBz12, and determining a first angle θmain based on the first ratio R1, and outputting the first angle θmain;
d) determining 1404 a second ratio R2 of the first difference ΔBx12 and the third difference ΔBy12;
e) optionally determining a second angle θaux based on the second ratio R2;
  optionally comparing the first angle θmain and the second angle θaux, yielding a first outcome;
  optionally comparing the first ratio R1 and the second ratio R2, yielding a second outcome;
  outputting 1405 at least one of: the second angle θaux, the first and the second ratio R1, R2, a diagnostic signal based on the first outcome and/or the second outcome.

Many variants of this method are possible, as described above, especially in FIG. 6(*a*) to FIG. 11(*d*).

FIG. 15 shows an electrical block-diagram of a circuit that may be used in position sensor devices described above, but the present invention is not limited hereto, and other block diagrams may also be used.

The circuit 1510 comprises a plurality of magnetic sensor elements, and a processing unit 1530, and a non-volatile memory 1531. This block-diagram can be used for example in sensor devices having a sensor structure like that of FIG. 6(*c*), comprising eight horizontal Hall elements H1 to H8, but the present invention is not limited thereto. For example, in case the sensor device has a sensor structure like that of FIG. 6(*d*), the sensor device would comprise two horizontal Hall elements and four vertical Hall elements. In case the sensor device has a sensor structure like that of FIG. 8(*c*) or FIG. 8(*d*), the sensor device would comprise only six horizontal Hall elements. In case the sensor device has a sensor structure like that of FIG. 9(*c*), the sensor device would comprise twelve horizontal Hall elements, etc. And as mentioned above, it is also possible to use magneto-resistive (MR) elements.

The processing unit 1530 may be configured for performing the method 1400 described above, or variants thereof. The sensor device 1510 may be connected to a second processor 1540, for example to an electronic control unit 1540 (ECU), by means of one or more wires, or wireless (e.g. via a radio frequency link RF, or an infra-red link IR).

The sensor device outputs at least the main angle θmain. Depending on which method is implemented, the sensor device 1510 may also output one or more of the following values: θaux12, θaux23, the average of θaux12, θaux23, θaux3, described above, etc. The sensor device may perform a match or consistency check inside the device, and provide a result of the test as a diagnostic signal, but that is not absolutely required, and it is also possible to let the external processor 1540 perform the comparison or consistency check.

The processing unit 1530 may comprise a digital processor, which may optionally comprise or be connected to a non-volatile memory 1531. This memory may be configured for storing one or more constants, for example one or more of the offset values ε12, ε23, of threshold values for determining whether the angles match, or deviate too much, one or more of the K-factors mentioned above, etc. The digital processor may for example be an 8-bit processor, or a 16-bit processor.

While not explicitly shown, the circuit 1510 may further comprise one or more components or sub-circuits selected from the group consisting of: a biasing source (e.g. a current source, a voltage source), an amplifier, a differential amplifier, an analog-to-digital convertor (ADC), etc. The ADC may have a resolution of at least 8 bits, or at least 10 bits, or at least 12 bits, or at least 14 bits, or at least 16 bits. These components are well known in the art, and therefore need not be described in more detail here.

The invention claimed is:

1. A position sensor device comprising:
  a substrate comprising a first and a second magnetic sensor, spaced apart in a first direction, each magnetic sensor capable of measuring three orthogonal magnetic field components including a first magnetic field component oriented in the first direction, a second magnetic field component oriented in a second direction perpendicular to the first direction, and a third magnetic field component oriented in a third direction perpendicular to the first direction and perpendicular to the second direction;
  a processing circuit connected to said first and second magnetic sensor, and configured for:
    a) measuring by each of the first and second sensor, a first magnetic field component oriented in the first direction, and a second magnetic field component oriented in the second direction, and a third magnetic field component oriented in the third direction;
    b) determining a first difference between the first magnetic field components, and a second difference between the second magnetic field components, and a third difference between the third magnetic field components;
    c) determining a first ratio of the first difference and the second difference, and determining a first angle based on the first ratio, and outputting the first angle as a first signal;
    d) determining a second ratio of the first difference and the third difference; or determining a second ratio of the first difference and a linear combination of the third difference and the second difference;
    e) outputting a second signal comprising at least one of: a second angle based on the second ratio, the first and the second ratio, a diagnostic signal based on a first outcome of comparing the first angle and the second angle, and a diagnostic signal based on a second outcome of comparing the first ratio and the second ratio.

2. The position sensor device according to claim 1, wherein step d) comprises: determining a second ratio of the first difference and the third difference; and
  wherein step e) comprises: determining a second angle based on the second ratio; and
  outputting the second signal comprising at least one of: the second angle, a diagnostic signal based on a comparison of the first angle and the second angle.

3. The position sensor device according to claim 1, wherein step d) comprises: determining a second ratio of the first difference and the third difference; and
  wherein step e) comprises: outputting the second signal comprising at least one of: the first and the second ratio, a diagnostic signal based on a comparison of the first ratio and the second ratio.

4. The position sensor device according to claim 1, wherein step d) comprises: determining a second ratio of the first difference and a linear combination of the third difference and the second difference;
  wherein step e) comprises: determining a second angle based on the second ratio; and outputting the second signal comprising at least one of: the second angle, a diagnostic signal based on a comparison of the first angle and the second angle.

5. The position sensor device according to claim 1, wherein step d) comprises: determining a second ratio of the first difference and a linear combination of the third difference and the second difference;
wherein step e) comprises: outputting the second signal comprising at least one of: the first and the second ratio, a diagnostic signal based on a comparison of the first ratio and the second ratio.

6. The position sensor device according to claim 1, wherein one or more or each of the sensors comprises an integrated magnetic concentrator and two horizontal Hall element arranged on opposite sides of the IMC; or
wherein one or more or each of the sensors comprises an integrated magnetic concentrator and three horizontal Hall elements, angularly spaced by multiples of 90°; or
wherein one or more or each of the sensors comprises an integrated magnetic wherein one or more or each of the sensors comprises an integrated magnetic concentrator and four horizontal Hall elements, angularly spaced by multiples of 90°; or
wherein one or more of the sensors comprises a horizontal Hall element and a single vertical Hall element or a pair of two vertical Hall elements located on opposite sides of the horizontal Hall element; or
wherein one or more of the sensors comprises two vertical Hall elements having directions of maximum sensitivity which are perpendicular to each other.

7. The position sensor device according to claim 1, wherein each sensor comprises an integrated magnetic concentrator and four horizontal Hall elements angularly spaced by multiples of 90°, consisting of a first and a second Hall element being spaced apart along the first direction, and a third and a fourth Hall element spaced apart in a direction perpendicular to the first direction;
wherein the first angle is calculated based on signals obtained from the first and the second Hall element; and
wherein the sensor device is further configured to determine a first sum as a sum of the signals obtained from the first and the second Hall element, and to calculate a second sum as a sum of the signals obtained from the third and the fourth Hall element, and to take into account a match of the first sum and the second sum when determining the diagnostic signal.

8. A magnetic position sensor system comprising:
a magnetic source for generating a magnetic field having at least two poles;
a position sensor device according to claim 1, movable relative to said magnetic source, or vice versa.

9. The magnetic position sensor system according to claim 8, wherein the magnetic source is a permanent magnet, rotatable about a rotation axis; and
wherein the position sensor device is mounted at a nonzero radial distance from the rotation axis, and is oriented such that the first direction is tangential to an imaginary circle having a centre on the rotation axis.

10. The magnetic position sensor system according to claim 8, wherein the magnetic source is a two-pole magnet, or an elongated structure extending in a longitudinal direction and comprising a plurality of at least two alternating magnetic pole pairs; and
wherein the position sensor device is movable in the longitudinal direction, at a nonzero distance from the magnetic source.

11. The magnetic position sensor system according to claim 8, further comprising a second processor communicatively connected to the position sensor device, and configured for performing one of the following:
i) receiving the first angle as the first signal;
ii) receiving the second signal comprising one or more of: the second angle, the first ratio and the second ratio, a diagnostic signal indicative of an error.

12. A position sensor device comprising:
a substrate comprising a plurality of at least three magnetic sensors, spaced apart in a first direction,
each magnetic sensor capable of measuring at least two orthogonal magnetic field components including a first magnetic field component oriented in the first direction, and one or both of a second magnetic field component oriented in a second direction perpendicular to the first direction and perpendicular to the substrate, and a third magnetic field component oriented in a third direction perpendicular to the first direction, and parallel to the substrate;
a processing circuit connected to said at least three magnetic sensors, and configured for:
a) measuring by a first pair of said sensors, a first magnetic field component oriented in the first direction, and a second magnetic field component oriented in the second direction;
b) measuring by a second pair of said sensors, different from the first pair, a first magnetic field component oriented in the first direction, and a third magnetic field component oriented in the third direction;
c) determining a first difference between the first magnetic field components of the first pair, and a second difference between the second magnetic field components of the first pair;
d) determining a first ratio of the first difference and the second difference, and determining a first angle based on the first ratio, and outputting the first angle as a first signal;
e) determining a third difference between the first magnetic field components of the second pair, and a fourth difference between the third magnetic field components of the second pair;
f) determining a second ratio of the third difference and the fourth difference;
g) outputting a second signal comprising at least one of: a second angle based on the second ratio, the first and the second ratio, a diagnostic signal based on a first outcome of comparing the first angle and the second angle, and a diagnostic signal based on a second outcome of comparing the first ratio and the second ratio.

13. The position sensor device according to claim 12, wherein the at least three sensors are located on a straight line; or
wherein the at least three sensors are located at the corners of a triangle.

14. A position sensor device comprising:
a substrate comprising a first magnetic sensor and a second magnetic sensor, spaced apart along an first axis extending in a first direction, wherein each magnetic sensor comprises an integrated magnetic concentrator and only three horizontal Hall elements, including a first, a second and a third horizontal Hall element, the first and the second horizontal Hall element located on the first axis, the third horizontal Hall element being angularly spaced by 90° with respect to the first and second Horizontal Hall element;

a processing circuit connected to said first and second magnetic sensor, and configured for:
   a) measuring by each of the first and second sensor, a first magnetic field component oriented in a first direction, as a difference of signals obtained from the first and second Hall element;
   and measuring by each of the first and second sensor, a second magnetic field component oriented in a second direction, perpendicular to the first direction, as a sum of signals obtained from the first and second Hall element;
   and measuring by each of the first and second sensor, a third value, as a signal obtained from the third Hall element;
   b) determining a first difference between the first magnetic field components, and a second difference between the second magnetic field components, and a third difference between the third values;
   c) determining a first ratio of the first difference and the second difference, and determining a first angle based on the first ratio, and outputting the first angle as a first signal;
   d) determining a second ratio of the first difference and the third difference;
   e) outputting a second signal comprising at least one of: a second angle based on the second ratio, the first and the second ratio, a diagnostic signal based on a first outcome of comparing the first angle and the second angle, and a diagnostic signal based on a second outcome of comparing the first ratio and the second ratio.

15. A method of determining a linear or angular position, based on signals obtained from a first and a second sensor, spaced apart in a first direction, each capable of measuring three orthogonal magnetic field components; the method comprising the following steps:
   a) measuring by each of the first and second sensor, a first magnetic field component oriented in a first direction, and a second magnetic field component oriented in a second direction perpendicular to the first direction, and a third magnetic field component oriented in a third direction perpendicular to the first and second direction;
   b) determining a first difference between the first magnetic field components, and a second difference between the second magnetic field components, and a third difference between the third magnetic field components
   c) determining a first ratio of the first difference and the second difference, and determining a first angle based on the first ratio, and outputting the first angle as a first signal;
   d) determining a second ratio of the first difference and the third difference; or determining a second ratio of the first difference and a linear combination of the third difference and the second difference;
   e) outputting a second signal comprising at least one of: a second angle based on the second ratio, the first and the second ratio, a diagnostic signal based on a first outcome of comparing the first angle and the second angle, and a diagnostic signal based on a second outcome of comparing the first ratio and the second ratio.

* * * * *